US012791754B1

(12) United States Patent
Koudelle et al.

(10) Patent No.: US 12,791,754 B1
(45) Date of Patent: Nov. 10, 2026

(54) MILLIMETER WAVE CAMERA CALIBRATION ARRANGEMENT

(71) Applicants: Larry Koudelle, Lafayette, CO (US); Brian Magenis, Brighton, CO (US); Kevin McKinstry, Westminster, CO (US); Robert W. Warren, Loveland, CO (US)

(72) Inventors: Larry Koudelle, Lafayette, CO (US); Brian Magenis, Brighton, CO (US); Kevin McKinstry, Westminster, CO (US); Robert W. Warren, Loveland, CO (US)

(73) Assignee: SYGHT, INC., Boulder, CO (US)

( * ) Notice: Subject to any disclaimer, the term of this patent is extended or adjusted under 35 U.S.C. 154(b) by 0 days.

(21) Appl. No.: 19/640,573

(22) Filed: Apr. 7, 2026

(51) Int. Cl.
*G01V 13/00* (2006.01)
*G01V 8/00* (2006.01)
*G01V 8/20* (2006.01)

(52) U.S. Cl.
CPC .............. *G01V 13/00* (2013.01); *G01V 8/005* (2013.01); *G01V 8/20* (2013.01)

(58) Field of Classification Search
CPC ........... G01V 13/00; G01V 8/005; G01V 8/20
See application file for complete search history.

(56) References Cited

U.S. PATENT DOCUMENTS 3,586,439 A 6/1971 Mckibben et al.
4,313,069 A 1/1982 Szabo et al.
4,661,809 A 4/1987 Anderson et al.
5,094,544 A 3/1992 Ignatowicz
6,191,851 B1 * 2/2001 Kirkham ................ G01J 3/524 250/252.1
6,262,574 B1 7/2001 Cho et al.
6,729,756 B2 5/2004 Sezai
6,875,979 B2 4/2005 Cope
(Continued)

FOREIGN PATENT DOCUMENTS

CN 104076358 A * 10/2014 ............ G01V 8/005
CN 113820752 A * 12/2021 ............ G01V 8/005
(Continued)

*Primary Examiner* — Daniel Pihulic
(74) *Attorney, Agent, or Firm* — Kenneth Altshuler

(57) ABSTRACT

A millimeter-wave (MMW) calibration imaging system is disclosed which can include at least one MMW detector having a receiving end configured to receive target-derived MMW energy along a detection path. A calibration member is movably positioned relative to the detection path and is driven by a motor to periodically move into and out of the detection path during detector operation. When positioned within the detection path, the calibration member at least partially interrupts target-derived MMW energy and presents calibration-member-derived MMW energy to the detector. A controller or processor determines the position of the calibration member relative to the detection path and distinguishes detector output corresponding to scene data from detector output corresponding to calibration data. In certain embodiments, the calibration member includes one or more temperature-controlled regions providing distinct reference temperatures for in-operation radiometric calibration of single or multiple detectors arranged in an array.

20 Claims, 17 Drawing Sheets

(56) References Cited

U.S. PATENT DOCUMENTS

| | | | | |
|---|---|---|---|---|
| 7,422,365 | B2 | 9/2008 | Chamberlain et al. | |
| 8,513,615 | B2 * | 8/2013 | Chen ...................... | G01N 22/00<br>250/382 |
| 10,345,631 | B1 | 7/2019 | Partee et al. | |
| 2014/0198217 | A1 | 7/2014 | Johnson et al. | |

FOREIGN PATENT DOCUMENTS

| | | | | | |
|---|---|---|---|---|---|
| CN | 121410696 | A | * | 1/2026 | |
| JP | 2010281737 | A | * | 12/2010 | ............... H04N 5/30 |

* cited by examiner

150

280b

MILLIMETER WAVE CAMERA CALIBRATION ARRANGEMENT

CROSS-REFERENCE TO RELATED APPLICATIONS

None

FIELD OF THE INVENTION

The present embodiments are directed to a calibration arrangement for a heat sensitive millimeter wave camera.

DESCRIPTION OF RELATED ART

Millimeter wave (MMW) imaging systems are being considered for detecting concealed objects, characterizing materials, and imaging scenes in environments where visible-spectrum imaging may be limited. Such systems may operate in passive radiometric modes, active illumination modes, or combinations thereof. In passive implementations, the system detects naturally emitted and reflected millimeter wave radiation from objects within a scene, whereas in active implementations an external MMW source illuminates the scene and reflected energy is measured.

MMW imaging systems generally generate image contrast based on differences in apparent temperature and material-dependent properties such as emissivity, reflectivity, and transmissivity within a scene. Because radiometric imaging relies on detecting relatively small variations in received millimeter wave power, system performance can be influenced by detector gain characteristics, amplification stages, analog-to-digital conversion behavior, and environmental conditions. Variations in internal component temperature of a MMW radiometer, ambient surroundings, or acquisition duration may affect baseline signal levels. To promote MMW imaging consistency, certain calibration techniques, such as using stationary calibration panels disposed between a target and MMW radiometer have been contemplated. While promising, such techniques have their limitations due to their size, complexity, and positioning in the MMW system imaging architecture.

It is to innovations related to this subject matter that the claimed invention is generally directed.

SUMMARY OF THE INVENTION

The present embodiments are directed to hand-held or stand-alone, either fixed or portable, millimeter wavelength and digital cameras, which include optical, IR, LIDAR, night vision, etc., which can generate digital images.

Certain embodiments of the present invention contemplate a millimeter-wave (MMW) calibration imaging system that comprises a detector, a motor, a calibration member, and a controller. The detector is configured to receive target-derived MMW energy from a target along a detection path. The motor is coupled to the calibration member, either directly through a shaft or other mechanical linkage. The motor is configured to periodically move the calibration member into and out of the detection path. When the calibration member is positioned within the detection path, the detector receives calibration-member-derived MMW energy. The controller is configured to determine when the calibration member is within the detection path and to distinguish detector output corresponding to target-derived MMW energy from detector output corresponding to calibration-member-derived MMW energy.

Another embodiment of the present invention contemplates a millimeter-wave (MMW) camera calibration system comprising at least one MMW detector, a calibration bar moveably interposed between a target and a processor that applies functionality to the system. This embodiment envisions at least one MMW detector comprising a receiving end configured to receive MMW energy along a line-of-sight during a period of time. The calibration bar is configured to move, during the period of time, between a first position intersecting the line-of-sight within six inches of the receiving end (or preferably within one inch) and a second position outside the line-of-sight. It should be appreciated that further distances can be applied given the specific architecture of the system. The processor configured to associate (that is correspond) detector output with calibration data when the calibration bar is in the first position and with scene data when the calibration bar is in the second position, which is naturally the case as the calibration bar sweeps across the receiving end or ends.

Yet another embodiment of the present invention contemplates a millimeter-wave (MMW) imaging calibration arrangement generally comprising a MMW detector coupled to a calibration bar that is driven by a motor and a processor that applies functionality to the arrangement. This embodiment envisions the MMW detector comprising a MMW energy receiving end that defines a line-of-sight. The calibration bar is configured to move during a period of time between a first position intersecting the line-of-sight within six inches of the receiving end and a second position outside the line-of-sight. The processor is configured to determine whether the calibration bar is in the first or the second position and to assign detector output based on the determined position of the calibration bar.

DETAILED DESCRIPTION

Figure 1A:
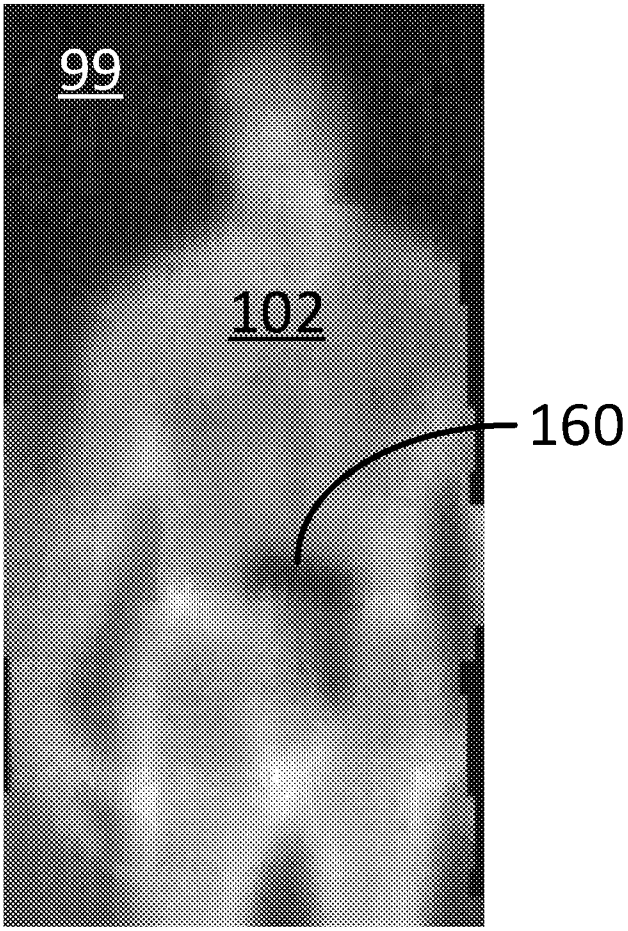
FIG. 1A is a black and white pixelated depiction of a MMW picture consistent with embodiments of the present invention.

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving the subject matter directed to the field of the invention. The phrases "in one embodiment", "according to one embodiment", and the like, generally mean the particular feature, structure, or characteristic following the phrase, is included in at least one embodiment of the present invention and may be included in more than one embodiment of the present invention. Importantly, such phrases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". Furthermore, as used herein, the term "essentially" is meant to stress that a characteristic of something is to be interpreted within acceptable tolerance margins known to those skilled in the art in keeping with ordinary manufacturing or operational tolerance, which is analogous with "more or less." For example, essentially flat, essentially straight, essentially on time, etc. all indicate that these characteristics are not capable of being perfect within the sense of their limits. Accordingly, if there is no specific +/−value assigned to "essentially", then assume essentially means to be within +/−2.5% of exact. The term "connected to" as used herein is to be interpreted as a first element physically linked or attached to a second element and not as a "means for attaching" as in a "means plus function". In fact, unless a term expressly uses "means for" followed by the gerund form of a verb, that term shall not be interpreted under 35 U.S.C. § 112(f). Unless otherwise stated, the term "end" is defined herein as the terminal part of something, which is essentially dimensionless. Hence, the terminology referring to an element "between" two ends (i.e., between a first end and a second end is exclusive of the ends). Likewise, the terminology that an element is between two other elements is intended to mean the element excludes the two other elements. Unless otherwise stated, the term "one" as defined herein is synonymous with "a", which may be a first of a plurality. In what follows, similar or identical structures may be identified using identical callouts.

With respect to the drawings, it is noted that the figures are not necessarily drawn to scale and are diagrammatic in nature to illustrate features of interest. Descriptive terminology such as, for example, upper/lower, top/bottom, horizontal/vertical, left/right and the like, may be adopted with respect to the various views or conventions provided in the figures as generally understood by an onlooker for purposes of enhancing the reader's understanding and is in no way intended to be limiting. All embodiments described herein are submitted to be operational irrespective of any overall physical orientation unless specifically described otherwise, such as elements that rely on gravity to operate, for example.

Certain embodiments of the present invention are directed to a millimeter-wave (MMW) calibration imaging system that includes at least one MMW detector having a receiving end configured to receive target-derived MMW energy along a detection path. A calibration member is movably positioned relative to the detection path and is driven by a motor to periodically move into and out of the detection path during detector operation. When positioned within the detection path, the calibration member at least partially interrupts target-derived MMW energy and presents calibration-member-derived MMW energy to the detector. A controller or processor determines the position of the calibration member relative to the detection path and distinguishes detector output corresponding to scene data from detector output corresponding to calibration data. In certain embodiments, the calibration member includes one or more temperature-controlled regions providing distinct reference temperatures for in-operation radiometric calibration of single or multiple detectors arranged in an array. As the calibration member moves into the detection path, the camera shifts from collecting target-derived MMW data to collecting calibration-member-derived MMW data, and then returns to collecting target-derived data when the calibration member moves out of the detection path.

Certain embodiments envision a MMW camera device that can be a combination of one or more digital optical cameras and MMW cameras. Each digital optical camera or cameras is configured to take digital images of a particular scene in the optical camera field-of-view and transfer the digital image/s to non-transitory memory in the camera device. Certain embodiments envision the digital optical camera, or cameras, being able to take images in an optical radiation range defined as including ultraviolet (UV), light, and infrared (IR) where one camera may be more suitable for a given optical radiation range and the additional cameras may be more suited for a different optical radiation range within the range specified herein. Hence, the optical radiation range as used herein essentially ranges from 100 nm to 1 mm, or spanning the lower limits of UV to the upper limits of IR. Certain embodiments of the present invention envision substituting the digital optical camera for cameras using different detecting techniques, such as LIDAR, night vision, etc., which can all generate digital images without departing from the scope and spirit of the present invention. It should also be appreciated that the use of an optical camera that strictly takes images within the light spectrum, or some variant thereof, is likewise considered an optical camera within the scope of the present invention. In contrast to a digital optical camera, the MMW camera detects frequencies essentially between 30-300 GHz making the MMW camera especially good at seeing objects of varied composition, such as metal, ceramic, plastics, liquids, under garments, such as concealed weapons on a person or in a bag, box, bin or some other carrier. The MMW camera can be arranged to point in the same field-of-view as the optical camera so that when a MMW picture is taken it is automatically framed within the optical camera field-of-view. In certain configurations, the MMW camera takes a plurality of MMW sub-images defined within a MMW field-of-view. In the case where the MMW field-of-view is smaller than the optical camera field-of-view, the multiple MMW sub-images can be stitched together and overlaid on the optical image of the same scene to show an object superimposed over a subject of interest, such as a person potentially carrying a concealed weapon or a weapon in a bag.

In general, MMW energy penetrates clothing and bags but partially reflects off humans, plastics, ceramics, and nearly perfectly reflects off metals. MMWs are non-ionizing (unlike X-Rays, for example) and are therefore safe for humans. Certain embodiments described below use only the energy already present in the environment and emitted from the objects in a target scene. The passive MMW camera arrangement does not emit radiation of its own from a MMW source. As exemplified in Table 1, all materials have a different emissivity $\varepsilon$, reflectivity $\rho$, and transmissivity $\tau$, such that:

$$\varepsilon+\rho+\tau=1$$

TABLE 1

| | Emissivity ε | Reflectivity ρ | Transmissivity τ | temperature |
|---|---|---|---|---|
| Clothing | 0.10 | 0 | 0.90 | 30 C. |
| Person | 0.60 | 0.40 | 0 | 37 C. |
| Metal | 0.01 | .99 | 0 | 22 C. |
| Isolated gun | 0.15 | 0.85 | 0 | 22 C. |
| Gun touching person | 0.15 | 0.85 | 0 | 33 C. |
| Plastic explosive | 0.40 | 0.60 | 0 | 33 C. |

Certain embodiments below measure the apparent temperature of each object detected in a scene, such as in accordance with the equation:

$$Tapp = \varepsilon * Temit + \rho * Trefl + \tau * Ttrans$$

Hence, for example, as shown by the MMW picture 150 of FIG. 1A, a gun 160 emits 15% at its temperature (midway between the gun holder's body 102 and the room 99), reflects 85% of the room temperature. No transmission. Therefore, $$\text{Gun: } Tapp = 0.15 * 33^\circ \text{ C.} + 0.85 * 22^\circ \text{ C.} + 0 * 37^\circ \text{ C.} = 23.7^\circ \text{ C.}$$

The person, on the other hand, emits 60% at body temperature and reflects 40% of the room temperature. No transmission.

$$\text{Person: } Tapp = 0.6 * 37^\circ \text{ C.} + 0.4 * 22^\circ \text{ C.} + 0 * 22^\circ \text{ C.} = 31.0^\circ \text{ C.}$$

Accordingly, even if the gun is at body temperature, the delta apparent temperature is still >6 degrees. The apparent temperature is the sum of the emissions from the object, the reflections off the object, and any energy that is coming through the object (this last term is usually 0).

FIGS. 1B-1E are block diagrams of a MMW and optic camera arrangement, which is configured to capture an optical image of a scene and display the optical image as an optical picture overlaid with a MMW picture. The MMW and optic camera arrangement 100, or simply camera arrangement, is consistent with embodiments of the present invention.

Figure 1B:
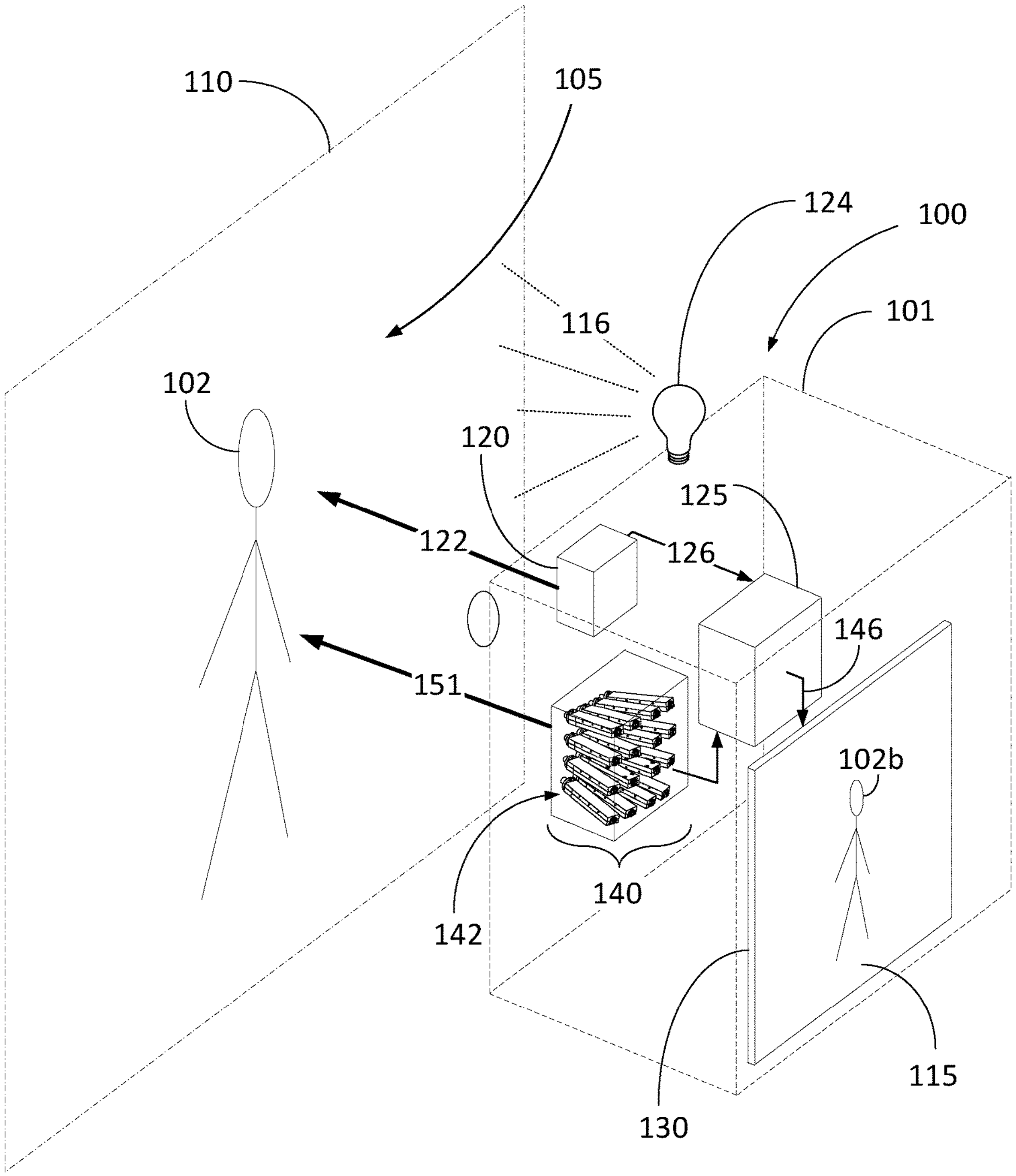
FIGS. 1B-1D are block diagrams of a MMW and optic camera arrangement consistent with embodiments of the present invention.

FIG. 1B is a line drawing of a scene 105 being viewed by a camera arrangement 100 that includes an optical camera system, or simply "optical camera", and a MMW camera system, or simply "MMW camera". FIG. 1B depicts the optical camera 120 obtaining a digital optical photo of the scene 105 and displaying the digital optical photo as an optical picture 115 displayed on the display screen 130. More specifically, the optical camera 120 is pointing towards a scene 105 comprising a person 102, which is considered a "target" herein. The scene 105 could just as easily include a bag, such as a duffel bag, as the subject matter containing or suspected of containing a concealed weapon with or without a human being present. The digital optical camera 120, which is well understood in the art and therefore the mechanics of which will not be discussed herein, has a line-of-sight 122 pointed towards the scene 105. The optical camera 120 is arranged to take an optical photo within the boundary of an optical camera field-of-view 110, depicted by the dashed-dotted rectangular line surrounding the scene 105. Field-of-view used herein means the picture size that the optical camera 120 can take in a single frame (i.e., not in a video). The digital optical photo taken by the optical camera 120 is transferred to the computer system 125 via an optical camera-to-computer connection 126, where the digital photo is processed. The computer system 125 transfers the processed digital photo to a display screen 130 via a computer-to-display connection 146. As shown, the optical picture 115 of the person 102*b* is rendered on the display screen 130. Certain commercial embodiments envision the display screen 130 being an LCD (liquid crystal display) or LED (light emitting diode) display screen, however a multitude of different kinds of screens can be equally used without departing from the scope and spirit of the present invention. Equally, the picture could be stored as a file or transmitted to an image analysis program without being displayed, without departing from the scope and spirit of the present invention. A light source 124 can further be integrated with the optical camera 120 to illuminate the scene 105 if it is insufficiently lit. Certain embodiments envision the light source 124 emitting light 116 in the visible range while other embodiments envision the light source 124 emitting light in a range outside the visible range (such as infrared and/or ultraviolet), wherein the optical camera 120 is capable of detecting images in the chosen light spectrum.

The camera arrangement 100 further includes a MMW camera 140, comprising a MMW camera detector array 142 (or matrix), which is also connected to the computer system 125. The MMW camera 140 is pointing at the scene 105 within the optical camera field-of-view 110, wherein in certain embodiments, the MMW camera's line-of-sight 151 can coincide with the optical camera line-of-sight 122. When the MMW camera 140 is pointing in the optical camera line-of-sight 122, it is envisioned to mean being parallel to the optical camera line-of-sight 122 and/or at least within the optical camera field-of-view 110. As shown in this embodiment, the MMW camera 140, the optical camera 120 and computer system 125 are essentially enclosed in a camera housing 101, with lenses, lights and apertures, the display screen 130 and other elements partially protruding or extending from the camera housing 101. It should be appreciated that the elements shown in or on the camera housing 101 could be interconnected within the housing 101 or independent of the housing 101, such as the display screen 130 being connected but remote to the computer system 125, for example.

Figure 1C:
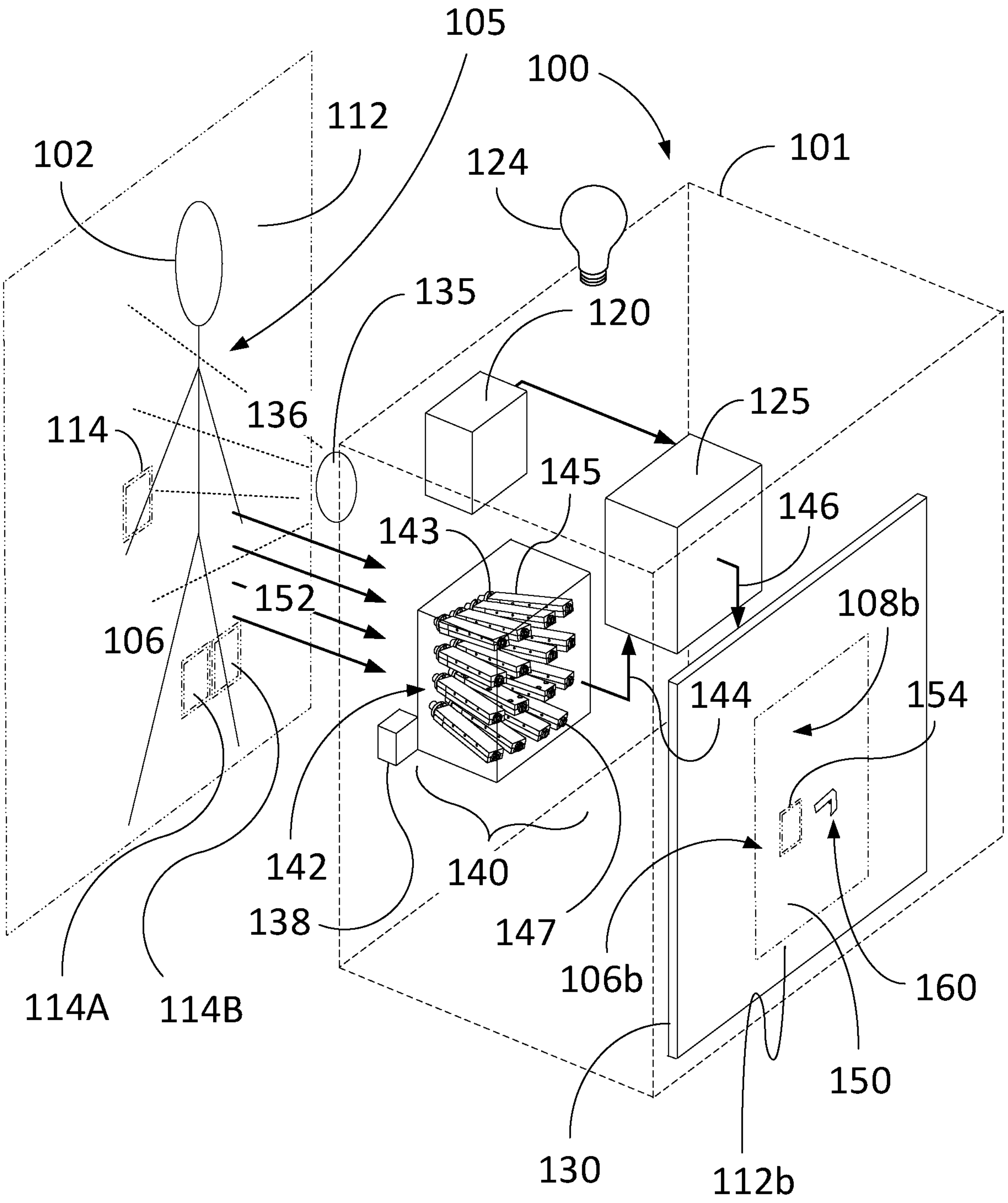

FIG. 1C is a line drawing of the scene 105 being viewed solely by the MMW camera 140 consistent with embodiments of the present invention. The MMW camera 140 is adept at imaging and is being used in this depiction to screen the person 102 (target) for a concealed weapon, or other metallic object. In one embodiment, the MMW camera 140 takes a single MMW picture 150 of a scene. In other embodiments, the MMW picture 150 can be made up of multiple MMW sub-images 154 that are displayed on the display screen 130. Here, the MMW perimeter 112 (which could be considered the perimeter of interest) is depicted by a double dotted dashed line. Certain embodiments contemplate the MMW field-of-view 114 being defined within the MMW perimeter 112, which in certain embodiments is smaller than the MMW perimeter 112. In this embodiment, the MMW field-of-view 114 is a portion of the MMW perimeter 112, that is a plurality of MMW sub-images 154 in the form of rows and columns make up the MMW picture 150 and therefore define the MMW perimeter 112. A MMW field-of-view 114 as used herein defines the MMW sub-image size 154. The MMW sub-image size 154, in turn, is defined by the number of individual MMW detectors 145 in the MMW camera detector array 142. Because the MMW field-of-view 114 is a fraction of the MMW perimeter 112 size, this embodiment contemplates the MMW camera 140 being moved either manually or by a MMW camera motor 138, depicted as a block connected to the MMW camera 140. The MMW camera motor 138 is envisioned to move the MMW camera 140 in both the X and Y directions to capture an array of MMW fields-of-view, such as a first MMW field-of-view 114A and a second MMW field-of-view 114B, and so on, which are then used to successively construct the MMW picture 150 by way of stitching together a plurality/array of MMW sub-images 154 (in rows and column). Other embodiments contemplate a static MMW camera 140 with a movable mirror arrangement that reflects MMW waves 152 from different portions of the scene 105 to successively construct the MMW picture 150. Either way, the MMW sub-images 154 may or may not be successively constructed on the display 130 but the MMW sub-image data sent by the MMW camera 140 to the computer 125 is assembled successively into the MMW picture data in the computer 125, which will be displayed as an MMW picture 150 on the display screen 130. It should be clear that a first MMW snapshot (MMW sub-image data) of a first field-of-view 114A is taken before a second MMW snapshot of a second field-of-view 114B is taken. Each MMW sub-image data (snapshot) from each field-of-view (114A then 114B) is sent or otherwise transmitted successively (one after the next) to a processor (either in the computer 125 or in the MMW camera 140 or somewhere cooperating with the computer 125 and/or MMW camera 140) to be assembled or otherwise stitched together. In an optional embodiment, the MMW data and/or optical data can be sent to a file or AI engine for detecting weapons, or just an alarm instead of being sent to a digital display screen 130.

The MMW camera system 140 detects electromagnetic waves (EMW) in the millimeter (mm) frequency range between 30 GHz and 300 GHz (possibly as low as 3 GHz). Based on principles of blackbody radiation, all objects above absolute zero radiate millimeter waves (MMWs) essentially uniformly in all directions. Objects also reflect ambient MMW in the environment, such as from sources like the sun, interior lighting, or other objects emitting MMW radiation. Based on their composition and temperature, objects emit/absorb, reflect, or transmit this MMW radiation differently. This difference in RF power that is emitted, reflected, or transmitted from each object is measured by the camera. In principle, this approach works for both passive (no sources of MMW energy other than the ambient environment) and active (a MMW source illuminating the target). In practice, active cameras tend to be dominated by reflection due to the power of the illumination source being chosen to be much stronger than the passive MMW radiation emitted as part of the blackbody radiation. This embodiment depicts an active MMW radiation source 135, that actively directs MMWs (waves) 136 at the MMW field-of-view 114. Certain embodiments envision the active MMWs 136 including MMW radar, MMW lighting, etc. Since the wavelength of MMWs is long enough to penetrate clothing (compared to visible light, for instance) yet is short enough to resolve small objects that reflect or emit MMW differently than the background (such as a person, a gun concealed in the waistband or the ground, or a bomb concealed in a bag and left under a bench, just to name a few examples), MMWs are particularly well-suited for identifying concealed contraband.

Figure 4A:
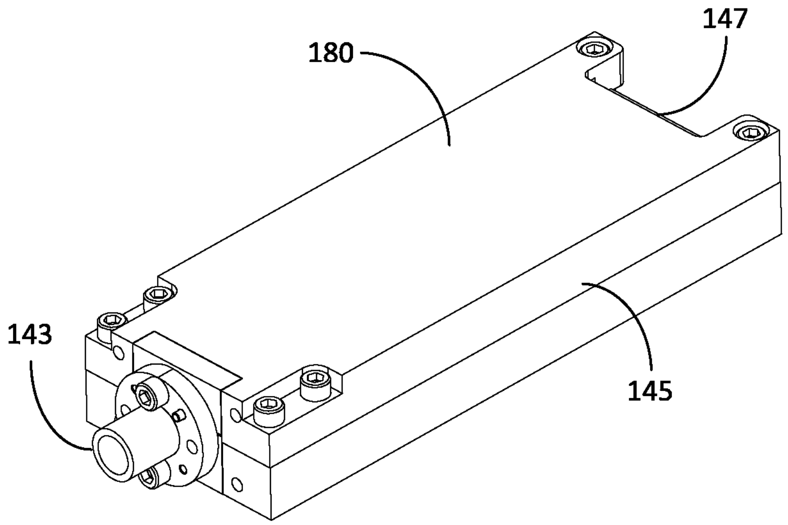
FIGS. 4A and 4B are line drawings that illustratively depict a MMW detector consistent with embodiments of the present invention.
Figure 4B:
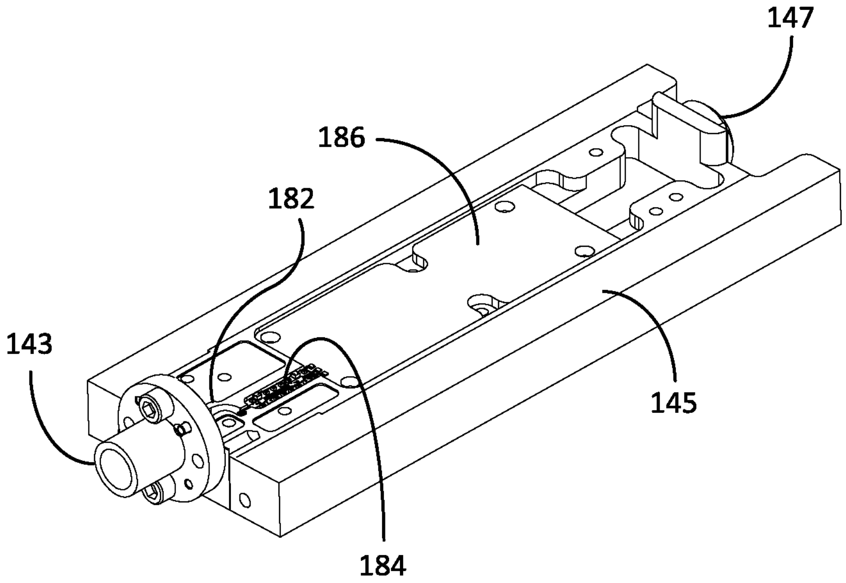

One commercial embodiment of a MMW detector 145, shown in FIGS. 4A and 4B, is the W-Band Radiometric Receiver produced by Eravant of Torrance, CA. This W-Band direction based radiometric receiver can measure the average power of the MMW radiation coming from a physical object in a frequency range of 75 GHz to 110 GHz. The MMW detector 145 receives MMW energy 152 at a MMW wave collecting end 143 (typically a horn and/or antenna), processes the received MMW energy, and transmits a digital output signal at an output end/output connector 147. The MMW wave collecting end 143 is the MMW receiver 143 of the detector 145.

Returning to FIG. 1C, as mentioned, the MMW detector output voltage signal of the MMW field-of-view 114 is electrically transmitted from the MMW detector array 142 to the computer system 125 via MMW camera-to-computer connection 144, which can be an electrical wire line for example. The computer system 125 conditions the MMW detector output voltage signal into a MMW intensity level enhanced MMW digital picture 150 (whereby metallic objects, in this example, are enhanced) that is sent over the computer-to-display connection 146 to the display screen 130 where it is displayed. The computer-to-display connection 146 can be a wireline connection between the computer system 125 and the display screen 130. The MMW digital picture 150 is defined by the MMW perimeter 112*b*, shown by the double dotted dashed perimeter line. The MMW digital picture 150 shows metallic objects of the scene 105 (i.e., images of metallic objects), which include a concealed gun shaped object 160. Though certain embodiments envision the MMW camera 125 collecting MMW energy 152 from an active source 135, such as an MMW radar, other embodiments envision no active source wherein the MMW camera arrangement 100 is a passive system using only ambient radiation reflected and emitted from the subject of interest. Certain embodiments envision the MMW radiation source 135 emitting a wavelength of between 3-300 GHz with some embodiments envisioning the MMW radiation source 135 emitting a wavelength centered at 94 GHz.

Figure 1D:
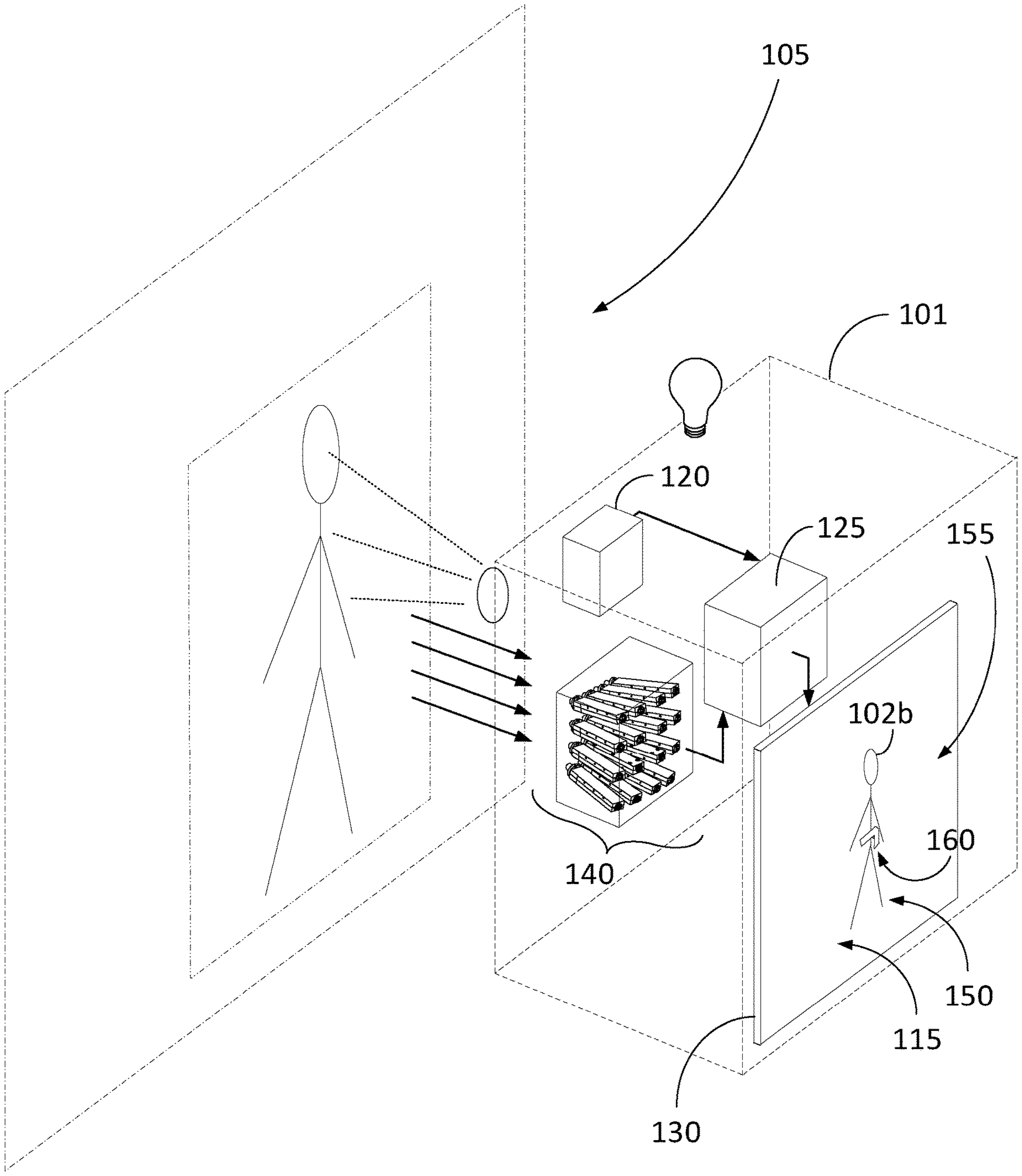

FIG. 1D is a line drawing illustratively showing the MMW picture 150 superimposed over the optical picture 115 in a joint overlaid MMW and optical picture 155. Certain embodiments envision the optical picture 115 of the scene 105 providing reference to the metallic object 160 from the MMW digital picture 150. Here, the display screen 130 depicts the superimposed (joint) optical MMW and optical picture 155 showing the person 102*b* (or some other living target) with the gun shaped object 160 that is obscured or otherwise unidentifiable in the optical picture 115 alone. Some embodiments envision a software algorithm retained and executed in the computer system 125 that matches the gun shaped object 160 to a best fit gun type based on digital recognition and or Artificial Intelligence (AI). Other embodiments simply identify that there is an object distinct from the background, which can serve as a warning to an end-user with alerts, such as light/s, sound, vibration, etc. Some embodiments imagine an alarm only sounding if an object is above a certain size or conforms to a certain shape so that people do not get harassed for wearing a wedding ring or eyeglasses, for example.

Figure 1E:
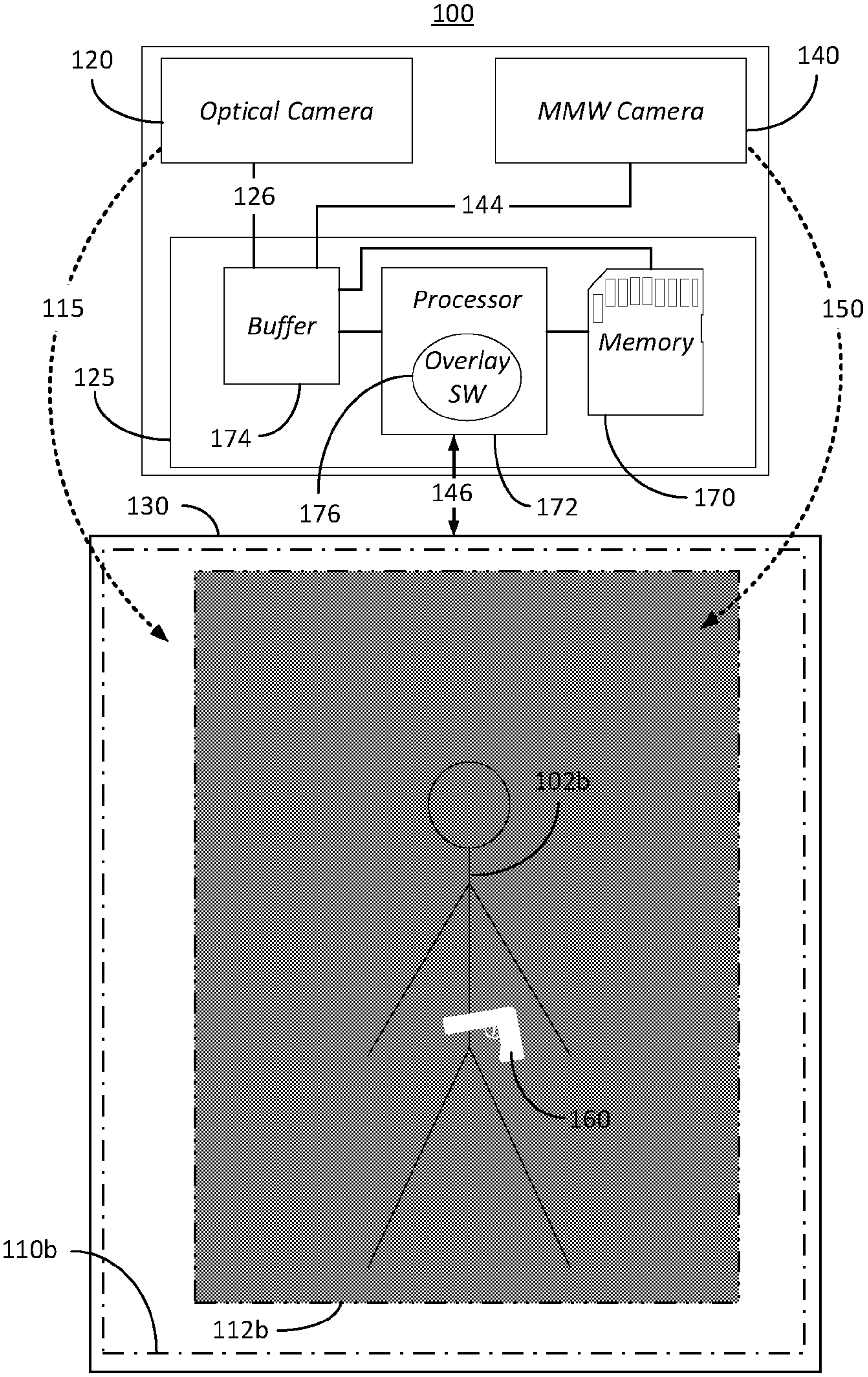
FIG. 1E is a block diagram of representative elements in the camera arrangement consistent with embodiments of the present invention.

FIG. 1E is a block diagram of representative elements in the camera arrangement 100 consistent with embodiments of the present invention. As previously discussed, the camera arrangement 100 generally comprises an optical camera 120 configured and arranged to capture an optical picture 115 of a scene 105 in addition to a MMW camera 140 configured and arranged to capture the MMW portion of the scene 105.

Both the optical picture 115 and the MMW picture 150, which is overlaid on the optical picture 115, are displayed on the display screen 130. In this figure, the optical picture field-of-view perimeter 110*b*, shown by the dot-dashed line, depicts the border of the displayed optical picture 115. The MMW picture perimeter 112*b*, shown by the double-dot-dashed line, depicts the border of the displayed MMW picture 150. The displayed MMW picture 150 is overlaid on the displayed optical picture 115. The displayed MMW picture 150 is shown as a gray rectangle with the metallic gun shaped object 160. The black outlines represent the displayed optical picture 115 of the person 102*b*.

In the present configuration, the optical camera 120 captures an image of the scene 105 with or without assisted illumination from the light source 124 and sends the optical picture data to a buffer storage 174 residing in the computer system 125. The buffered optical picture data can be sent to nonvolatile memory 170, which in certain embodiments is a solid-state non-transitory flash memory card, in addition to a processor 172 where the optical picture data is formatted (the optical formatting algorithm operated by the processor 172) as a displayable optical picture that is sent 146 to the display device 130. As shown by the connections between the buffer 174, the memory device 170, and the processor 172, the buffered optical picture (data) can be stored to the memory device 170 and/or sent directly to the processor 172 for formatting. The formatted optical picture 115 can then be sent to the memory device 170 where the formatted optical picture 115 can be retained for future access, for example.

Similarly, the MMW camera 140 captures at least one MMW sub-image 154 of at least a portion of the scene 105, with or without assisted MMW illumination 136, and sends the MMW image data to the buffer storage 174. The MMW image data is the data that is output by the MMW camera 140 to the computer 125 or display screen 130, wherein each MMW detector 145 receives a concentration of MMWs 152 from the target scene 105 and converts the received MMWs 152 into output MMW intensity data. The aggregate of the MMW intensity data values from each of the detectors 145 collectively defines MMW image data. The buffered MMW image data can be sent directly to the memory device 170 that is in communication with the processor 172 or directly to the processor 172. The processor 172 is arranged and configured to execute software algorithms 176 that convert the MMW image data as a displayable MMW image that is overlaid on the optical picture 115 (or optionally optical image data). The MMW picture 150 and the raw data received from the MMW camera 140 can be retained in the memory device 170. The MMW picture 150 (which can be stitched together from the MMW sub-images 154) is displayed on the display screen 130 either overlaid on the optical picture 115 or displayed independently. These pictures 115 and 150 can be produced later from the memory device 170, as well.

Figure 2A:
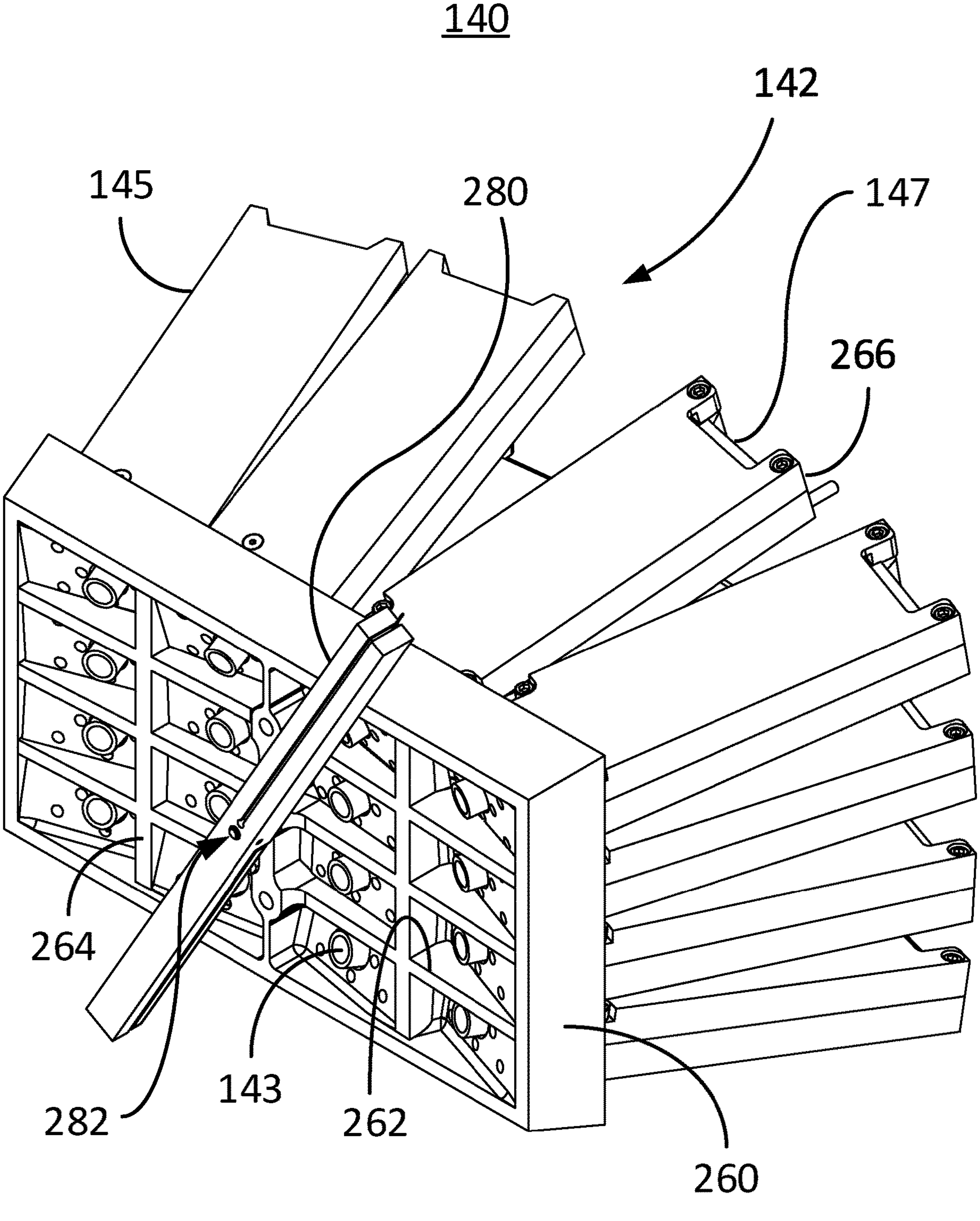
FIGS. 2A-2F are line drawings depicting a MMW camera arrangement consistent with embodiments of the present invention.

FIGS. 2A-2D are line drawings depicting a MMW camera arrangement consistent with embodiments of the present invention. FIG. 2A shows an isometric view of a MMW camera embodiment (radiometer array) 140 comprising 16 MMW detectors 145 anchored to a camera armature 260, which in this embodiment is a support housing. The camera armature 260 comprises 16 apertures (rectangular openings/holes) 262 in the housing front face 264, wherein each aperture 262 accommodates a respective MMW detector receiver end 143. The camera armature 260 can be statically mounted to a support frame, not shown. The MMW camera detector array 142 is arranged as a four by four (4×4) array of detectors 145, wherein each detector 145 comprises an output connector 147 located at the detector back side 266. Though each MMW detector (or radiometer) 145 is described herein as a single pixel detector, certain other embodiments envision a radiometer comprising a plurality of pixels by having a plurality of horns and multiple detection and amplification sections. One structure accomplishing this can be a visible camera CCD-like structure (charge-coupled device called a Focal Plane Array) that could be, for example, an array of 100×100 radiometers all on a flat wafer but each one fed by a 3D horn array that provides a 3D curve.

In this embodiment, the MMW camera 140 further comprises a calibration bar 280 configured to rotate about a rotational center point 282 positioned in front of the MMW detector receiving ends 143 of the detectors (radiometers) 145. The calibration bar 280 is movable between a first position permitting the detector receiving ends 143 to receive MMW energy from the scene 105 and a second position in which the calibration bar 280, and more specifically the calibration side 286, at least partially occludes the detector receiving ends 143. When positioned in front of the detectors 145, the calibration bar 280 presents a known radiometric reference condition to the radiometers 145. FIG. 2A in view of 2B shows the outward facing calibration bar side 284, which does not confront any of the detector receiving ends 143.

Because millimeter wavelength (MMW) detectors are responsive to small variations in received radiometric power, output levels may vary over time due to thermal, electronic, or environmental influences. The rotating calibration bar 280 periodically passes across the field-of-view of each detector receiving end 143, thereby providing a recurring reference signal that can be used to calibrate (i.e., normalize, compensate, or otherwise adjust) detector output to reduce drift and maintain consistency across the detector array 142.

In certain embodiments, the calibration bar 280 rotates at a frequency between approximately 1 Hz and 20 Hz, and preferably near 10 Hz. A rotary encoder or position sensor 271 (shown in FIG. 2E) is operatively coupled to the calibration bar 280 such that the computer system 125 (shown in FIG. 1D) can determine the angular position of the calibration bar 280 relative to the detector receiving ends 143. This positional information enables the system to distinguish between scene-acquired image data and calibration reference data, thereby permitting time-synchronized calibration of each radiometer 145 during operation.

Figure 2B:
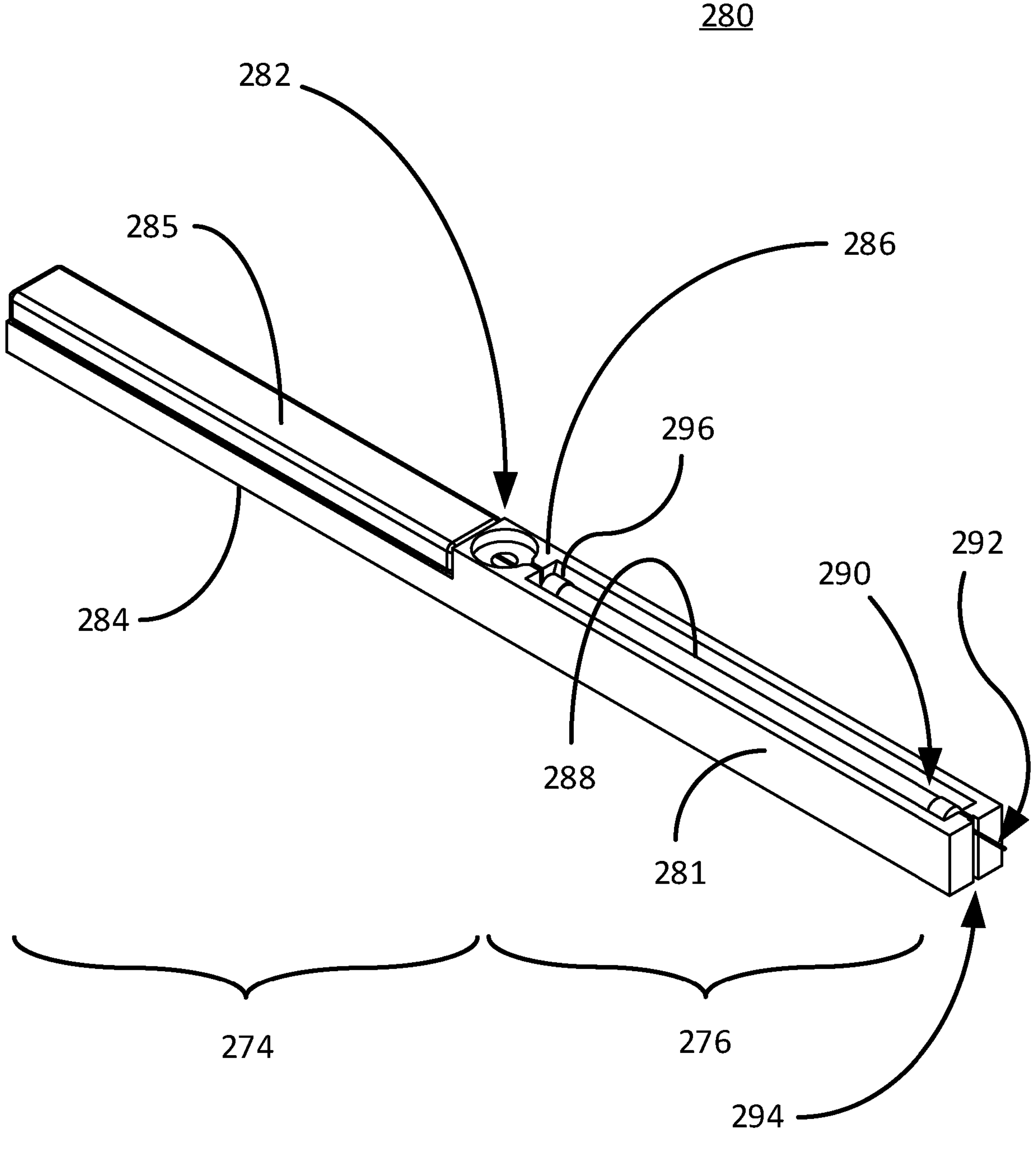

FIG. 2B is a line drawing illustrating an isometric view of a calibration bar embodiment 280 consistent with embodiments of the present invention. In FIG. 2B, the calibration bar 280 includes an outward facing calibration bar side 284 and a calibration side 286 that is oriented to confront, pass adjacent to, or otherwise oppose the detector receiving ends 143 during rotational movement of the calibration bar 280. The calibration bar 280 includes a calibration bar body 281 that serves as a structural support and potentially a thermal mass. In various embodiments, the calibration bar body 281 may comprise a rigid substrate material including, by way of example and not limitation, a metal (e.g., aluminum or other thermally conductive metals), a rigid polymer (e.g., machined, molded, or additively manufactured), or a fiber-reinforced composite (e.g., glass fiber or carbon fiber composites). The selected material may be chosen based on desired stiffness, mass, thermal conductivity, manufacturability, or integration with heating or sensing elements.

In the illustrated embodiment, the calibration bar 280 includes a cool temperature side 274 (shown on the left) and a warm temperature side 276 (shown on the right), each configured to provide a distinct radiometric reference as the calibration side 286 passes across the field of view of the detectors 145. The cool temperature side 274 includes an ambient temperature calibration bar (or region) 285 that may comprise a magnetically loaded elastomeric microwave absorbing material, such as a ferrite- or carbonyl iron-filled silicone composite. The ambient temperature calibration bar 285 may be formed entirely of such material or may comprise a structural substrate having a surface layer of such material disposed thereon (for example, Eccosorb® MMI, a commercially available microwave absorber produced by Laird Performance Materials of Minneapolis, Minnesota).

Because the ambient temperature calibration bar 285 comprises a magnetically lossy polymer composite configured to attenuate incident millimeter-wave (MMW) radiation, the ambient temperature calibration bar 285 exhibits reduced reflectivity and increased effective emissivity within the operational MMW band, thereby presenting a substantially uniform radiometric brightness temperature reference to the MMW detectors 145. In certain embodiments, the ambient temperature calibration bar 285 may include additional surface texturing or thickness selection to further improve impedance matching and minimize specular reflections. In alternative embodiments, a functionally equivalent electromagnetic absorbing or emissive material may be used to achieve similar radiometric performance.

It should be appreciated that other embodiments may omit a discrete ambient temperature calibration bar 285 and instead provide an absorbing or emissive coating directly on the cool temperature side 274 of the body 281 (to define simply a cool or ambient region). Still other embodiments may omit the cool temperature side 274 entirely, depending on the calibration architecture and whether a single-reference or dual-reference calibration approach is implemented.

With continued reference to FIG. 2B, the warm temperature side 276 comprises a heated bar (or element) 288 disposed within an accommodating channel 290 of the calibration bar 280. The heated bar 288 is configured to be maintained at a predetermined elevated temperature such that each of the detectors 145 observes a substantially uniform radiometric brightness temperature as the calibration bar 280 rotates past the detector receiving ends 143. In certain embodiments, the heated bar 288 comprises a ceramic heating element selected for thermal stability, electrical insulation, and lateral heat spreading characteristics.

In one embodiment, the heated bar 288 is an electrically resistive heating element integrated within or coupled to a thermally conductive ceramic body that promotes uniform surface temperature distribution along its length. The exposed surface may be coated with a high-emissivity, low-reflectivity millimeter-wave (MMW) coating configured to increase effective emissivity and reduce specular reflections, thereby approximating a blackbody calibration target within the operational MMW frequency band. Suitable coatings may include, by way of example and not limitation, high-emissivity black polyurethane thermal-control coatings, inorganic black thermal-optical coatings, low-reflectance "velvet" coatings, high-temperature emissive paints, silicon carbide-based surface treatments, carbon-loaded ceramic glazes, or other functionally equivalent emissive layers.

In other embodiments, a distributed heating source such as an infrared or visible light bar may be used to thermally excite or otherwise heat a surface layer that serves as a diffuser and thermal spreader, provided that the resulting surface temperature distribution remains substantially uniform across the active detector field of view.

In certain implementations, temperature regulation may be achieved through closed-loop control including one or more temperature sensors (e.g., thermistors, RTDs, or thermocouples) embedded within or adjacent the heated bar 288 to maintain a stable and repeatable calibration temperature.

The heated bar 288 is retained within the channel 290 by structural end caps 296. Electrical power is supplied to the heated bar 288 via electrical leads 292 routed along an accommodating wire groove 294 and electrically coupled to power provided through the rotary shaft 275 (of FIG. 2E) at the rotational center point 282 of the calibration bar 280.

In certain embodiments, rather than defining a passive cool temperature side 274 and a separate warm temperature side 276, the calibration bar 280 may include first temperature side 274 and a second temperature side 276 that are independently held at two different controlled temperatures having a predetermined temperature differential (ΔT) therebetween. Each side 274 and 276 may be actively heated, for example using elongated resistive heating elements or tubular lamp elements operated at different input voltages or power levels to establish a lower radiometric brightness temperature reference and a higher radiometric brightness temperature reference. In this manner, the detectors 143 may be calibrated using two actively generated and stabilized temperature setpoints, rather than relying on an ambient temperature reference. Because the heating elements may extend substantially along their respective length of the calibration bar 280 and operate in a steady-state regime, each temperature region or side 274 or 276 may present a substantially uniform axial temperature distribution and corresponding uniform MMW emission profile across the detector field of view. A thermally conductive, high-emissivity coating or sleeve may be disposed over each temperature side 274/276 to promote lateral heat spreading, reduce reflectivity, and stabilize effective emissivity within the operational MMW band.

Figure 2C:
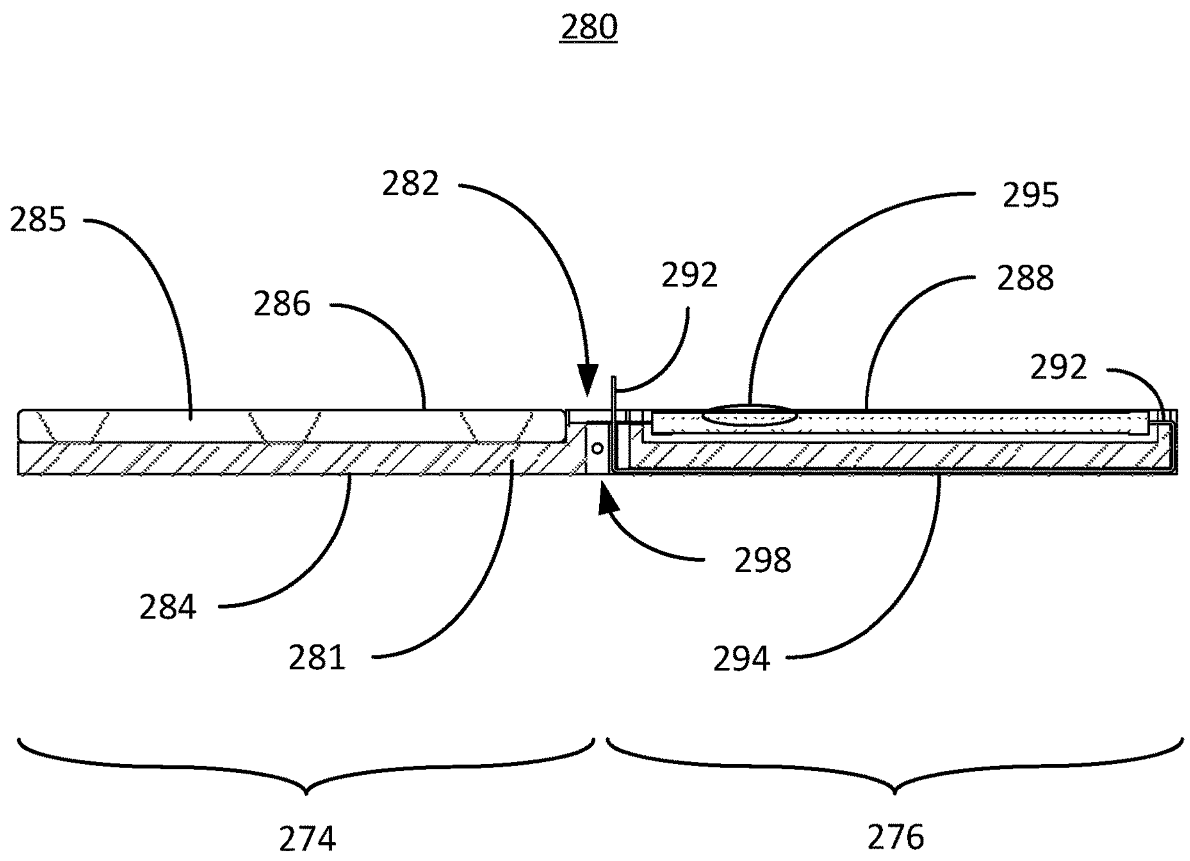

FIG. 2C is a cross-sectional line drawing of the calibration bar 280 illustrating the internal structure of the components previously described with respect to FIG. 2B, consistent with embodiments of the present invention. As shown, the calibration bar 280 includes a calibration bar body 281 defining a generally elongated structure extending laterally across the field of view of the MMW detector receiving ends 143. The calibration bar body 281 supports an ambient temperature calibration region 285 disposed along the cool temperature side 274 and a heating element assembly 288 disposed along the warm temperature side 276. In the illustrated embodiment, both the ambient temperature calibration region 285 and the heating element assembly 288 are positioned along the calibration side 286 such that, upon rotation, each selectively passes in front of the detector receiving ends 143 to provide distinct radiometric reference temperatures for calibrating the detectors 145.

The rotational center point 282 of the calibration bar 280 comprises a rotary shaft bore 298 formed through the calibration bar body 281 and dimensioned to receive a rotary shaft 275. The rotary shaft 275 defines the rotation axis in this embodiment. The rotary shaft 275 is operatively coupled to a motor and timing system (such as the optical encoder sensors 271 communicatively linked to the motor 272, as shown in FIG. 2E), which may include an encoder arrangement configured to synchronize rotational position with detector sampling. In certain embodiments, electrical power for the heating element assembly 288 is delivered via an electrical lead 292 routed through the rotary shaft 275. The rotary shaft 275 may define an internal passageway (not shown) for accommodating the electrical lead 292, thereby permitting continuous rotation while maintaining electrical connectivity. The heating element assembly 288 may include an internal resistive heating coil 295 embedded within a thermally conductive substrate to promote uniform temperature distribution along the warm temperature side 276.

Figure 2D:
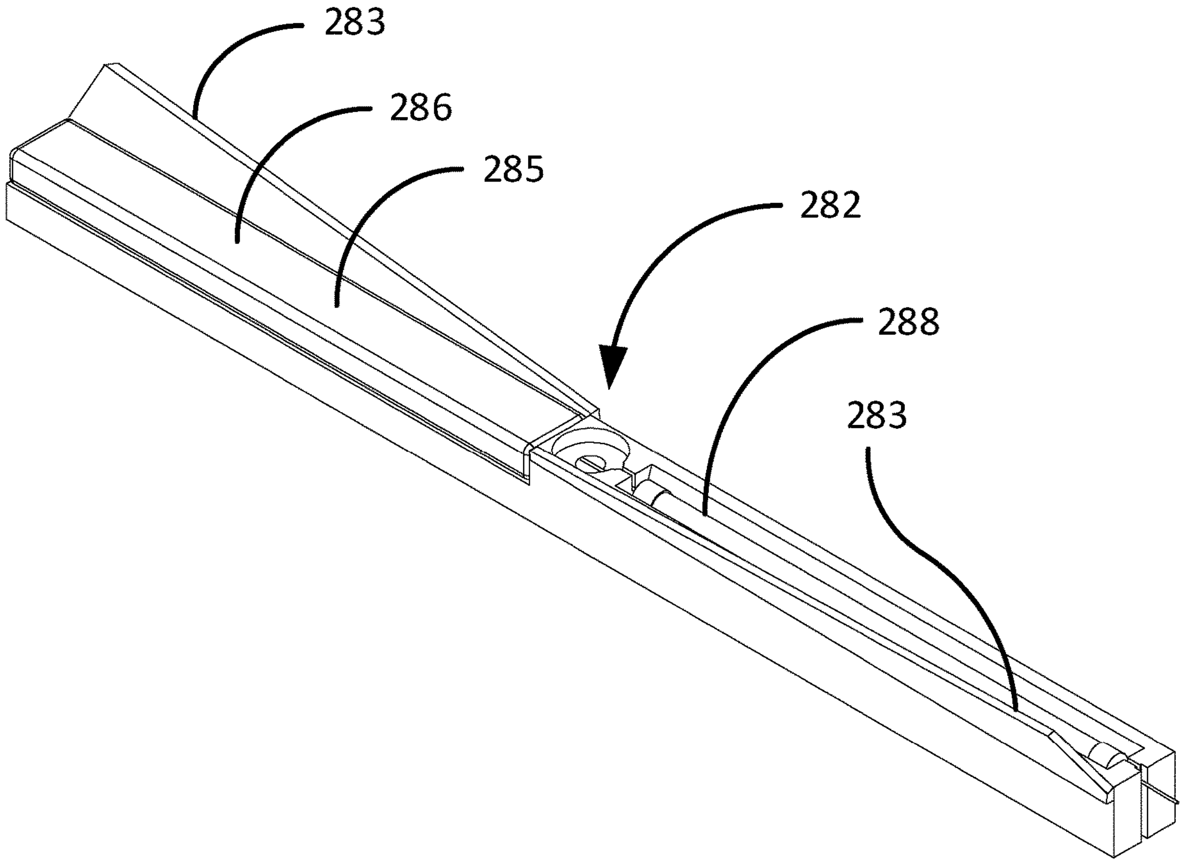
Figure 2E:
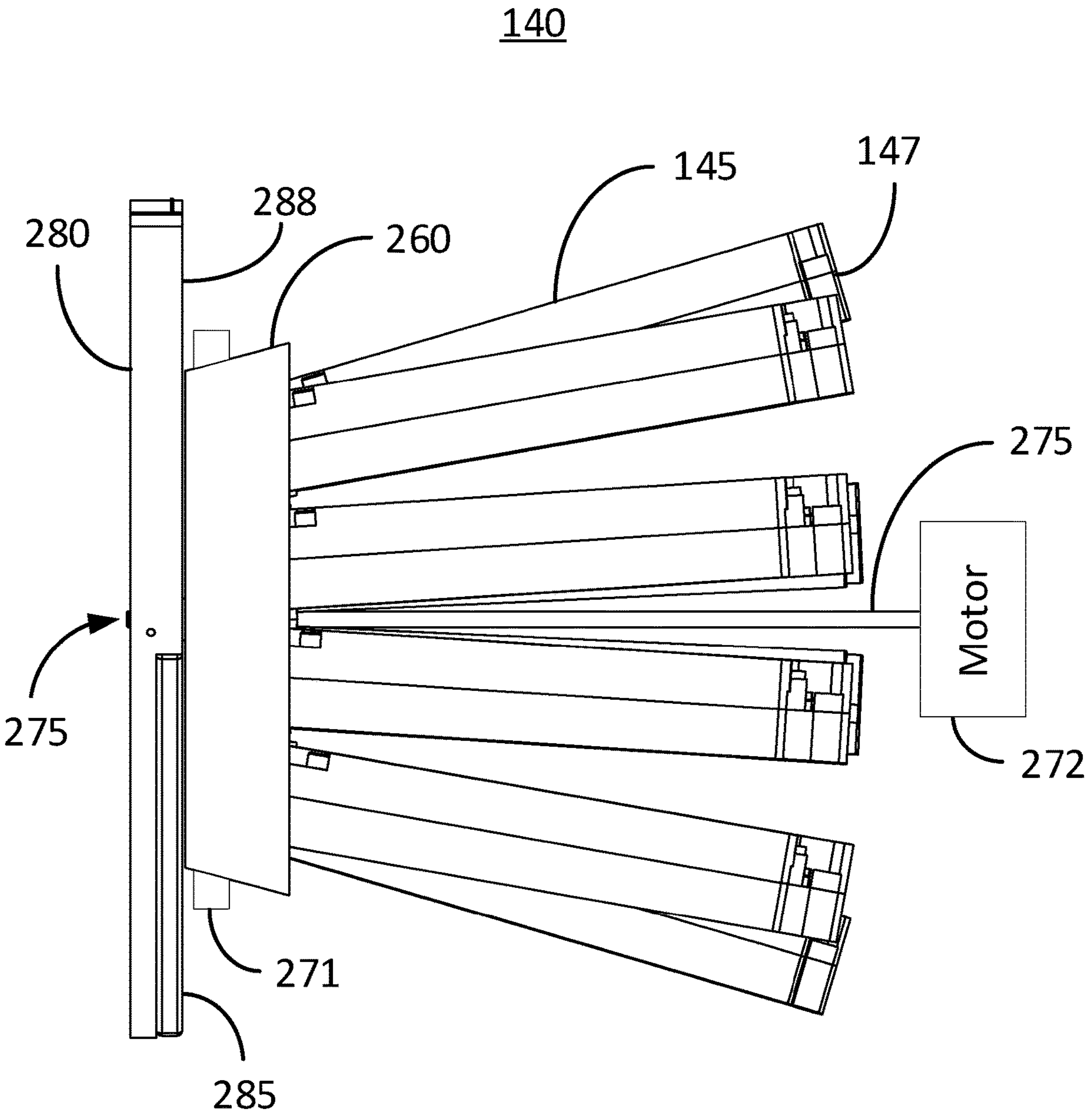

FIG. 2D is a line drawing of an optional calibration bar embodiment incorporating an integrated cooling feature consistent with embodiments of the present invention. In this embodiment, the calibration bar **280*b* includes one or more fan blades 283 coupled to and extending from the calibration side 286. In alternative configurations, the fan blades 283 may be positioned along lateral edges of the calibration bar 280*b* or along the outward-facing calibration bar surface 284**.

During operation, the radiometers 145 and associated electronics may generate heat. The fan blades 283 are configured such that rotation of the calibration bar **280*b* induces airflow across the radiometers 145 and adjacent circuitry, thereby promoting convective heat transfer away from the detector assembly. This active airflow may assist in maintaining thermal stability of the radiometers 145**, reducing temperature-induced drift, and supporting improved long-term operational performance.

FIG. 2E is a side view line drawing of the MMW camera arrangement 140 and rotary calibration bar 280, and further illustrates a motor 272 and one or more position feedback components 271 operatively associated therewith. The rotary calibration bar 280 is mounted to the rotary shaft 275, which is mechanically coupled to the motor 272. In the illustrated embodiment, one or more optical encoders 271 are mounted to or supported by the camera housing 260 and are communicatively linked to a controller (not shown), which may reside within or cooperate with the computer system 125.

In certain embodiments, the position feedback sensor 271 comprises an optical encoder configured to generate signals corresponding to angular displacement of the rotary shaft 275 and, therefore, the rotary calibration bar 280. The encoder may provide high-resolution angular position data and optionally an index reference signal identifying a known rotational datum. The controller receives the encoder signals and determines, in real time, the instantaneous angular position, rotational velocity, and direction of rotation of the rotary calibration bar 280.

In other embodiments, angular position may be determined without a separate optical encoder. For example, the motor 272 may comprise a stepper motor, wherein shaft position is inferred from commanded step counts. In such configurations, the controller tracks cumulative step commands to determine the angular position of the rotary calibration bar 280 relative to a known home position. In further embodiments, the motor 272 may include integrated position sensing, such as Hall-effect sensors, magnetic encoders, resolvers, or back-EMF sensing, thereby providing position feedback without a discrete external encoder component. In still other embodiments, rotational position may be inferred from timing control when operating at a controlled and calibrated rotational speed.

Regardless of the specific sensing architecture employed, the controller is configured to determine the angular position of the rotary calibration bar 280 relative to the detector receiving ends 143. This positional information is used to synchronize detector sampling with the rotary calibration bar 280 position such that the computer system 125 (or some other cooperating processor or computer) can determine whether each MMW radiometer 145 is observing the scene 105 or a calibration reference surface 285 or 288. Detector output may therefore be selectively processed as scene data or calibration reference data based on position-derived thresholds or timing windows.

As previously described in connection with FIG. 2C, the calibration bar 280 includes the heating element 288 and the ambient temperature calibration bar 285 disposed along the calibration side thereof. In FIG. 2E, these components are shown oriented toward the detector receiving ends 143 (obscured within the camera housing 260). The motor 272 drives the rotary shaft 275 to rotate the calibration bar 280 at a controlled rotational frequency, which in certain embodiments may be between approximately 1-20 Hz, and preferably about 10 Hz.

In certain implementations, the controller employs closed-loop or open-loop control strategies to regulate motor operation and maintain a stable rotational frequency and predictable phase alignment relative to detector sampling intervals. As the calibration bar 280 rotates across the field of view, the heated and ambient reference regions 285 and 288 are sequentially presented to the detector receiving ends 143, intermittently interrupting MMW radiation 152 from the target scene 105 and thereby providing alternating reference temperature exposures. These periodic, position-synchronized reference exposures facilitate compensation for detector drift, gain variation, and baseline offset in the radiometers 145. The radiometer output ends 147 are illustrated for reference.

Figure 2F:
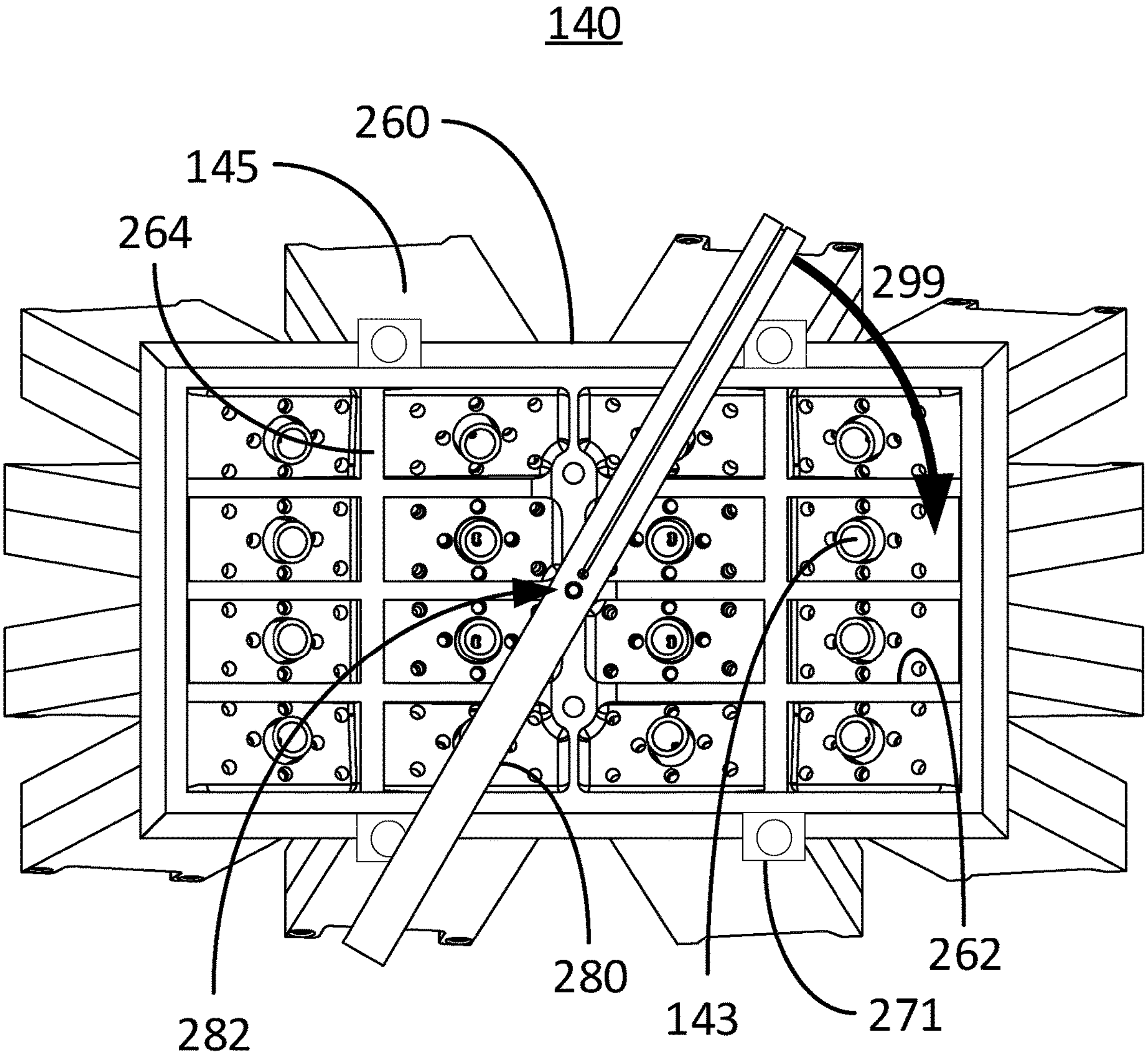

FIG. 2F is a front view line drawing of the MMW camera arrangement 140 and rotary calibration bar 280. As shown, the rotary calibration bar 280 is rotating clockwise as indicated by rotation arrow 299 about the rotational center point 282. The detector receiving ends 143 of the camera array 140 are oriented outwardly toward a scene 105. As shown, sixteen radiometers 145 are retained within the camera housing 260 such that their detector receiving ends 143 are exposed through corresponding housing apertures 262 formed in the front face 264 of the housing. During rotation, the rotary calibration bar 280 periodically passes in front of and temporarily obscures each detector receiving end 143.

The angular position of the rotary calibration bar 280 is always known, for example via a rotary encoder sensor system 271 coupled to, or otherwise communicatively associated with a controller (not shown) in the motor 272, such that system electronics can determine whether each radiometer 145 is observing the scene 105 or the rotary calibration bar 280 at any given moment. This positional awareness permits controlled, high-rate calibration events interleaved with scene acquisition.

In certain embodiments, the rotary calibration bar 280 rotates at a substantially constant frequency, such as approximately 10 Hz, thereby providing frequent normalization of radiometer output to mitigate thermal or electronic drift. Other rotational frequencies may be selected to balance calibration rate against scene acquisition time, as rotation of the rotary calibration bar 280 necessarily reduces the available sampling interval for observing the scene 105.

In further embodiments, the rotary calibration bar 280 may operate in a non-constant or programmed rotational profile. For example, the rotary calibration bar 280 may remain stationary for extended scene capture intervals and then rotate through one or more rapid calibration cycles. In one illustrative example, the rotary calibration bar 280 may rotate once every 10 seconds with a rotation duration of approximately 0.2 seconds. In another example, the rotary calibration bar 280 may execute a burst of multiple rotations (e.g., five rotations at approximately 10 Hz) followed by a pause interval (e.g., several seconds or longer). Such programmed operation may improve MMW video capture, enhance temporal stitching of multiple MMW sub-images 154, or support generation of a sequence of MMW pictures 150 with improved radiometric stability.

Figure 3A:
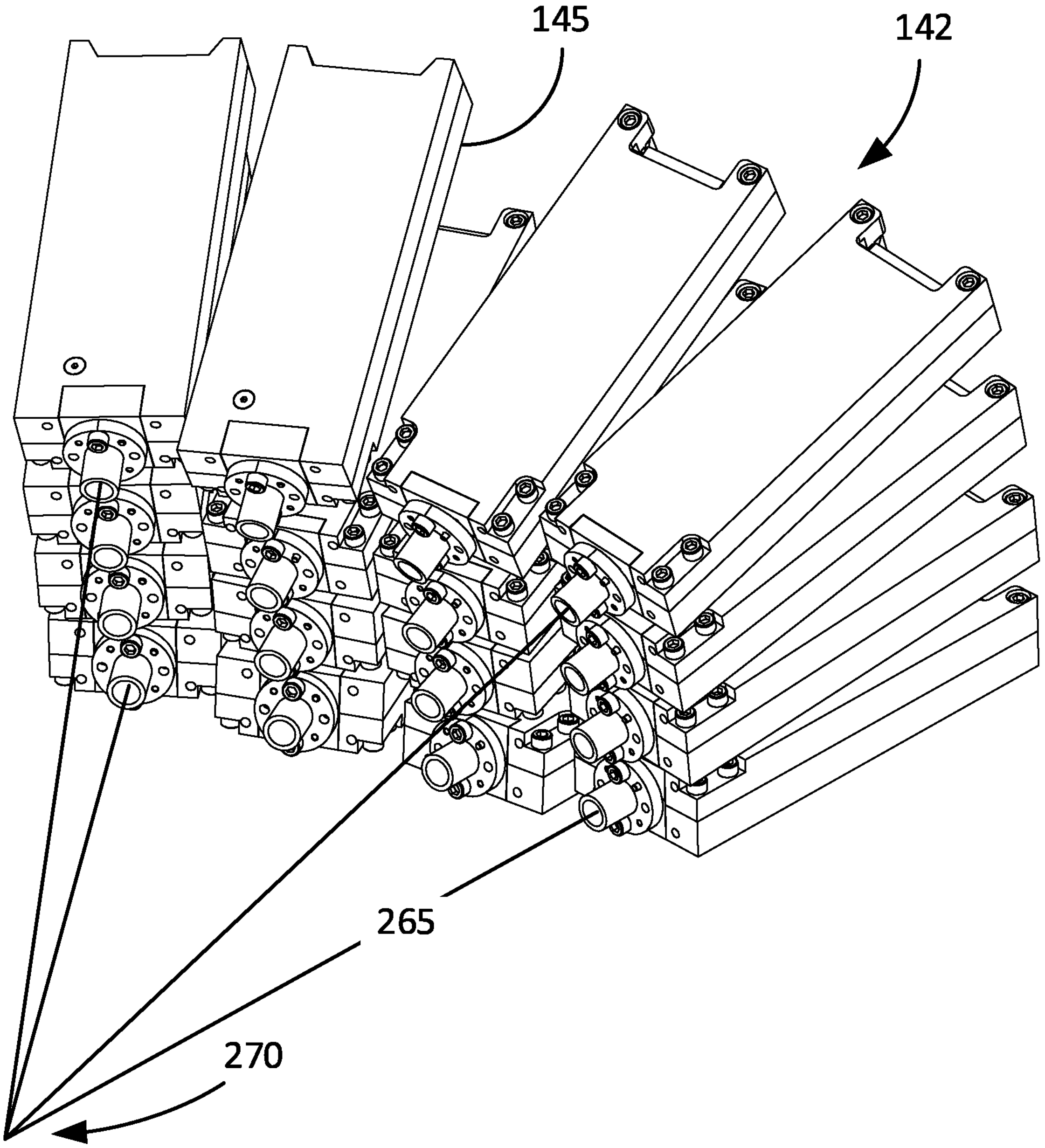
FIGS. 3A and 3B are line drawings of different perspective views of the detector array embodiment of FIG. 2A without the camera housing to better show the orientation of the detectors in the array consistent with embodiments of the present invention.
Figure 3B:
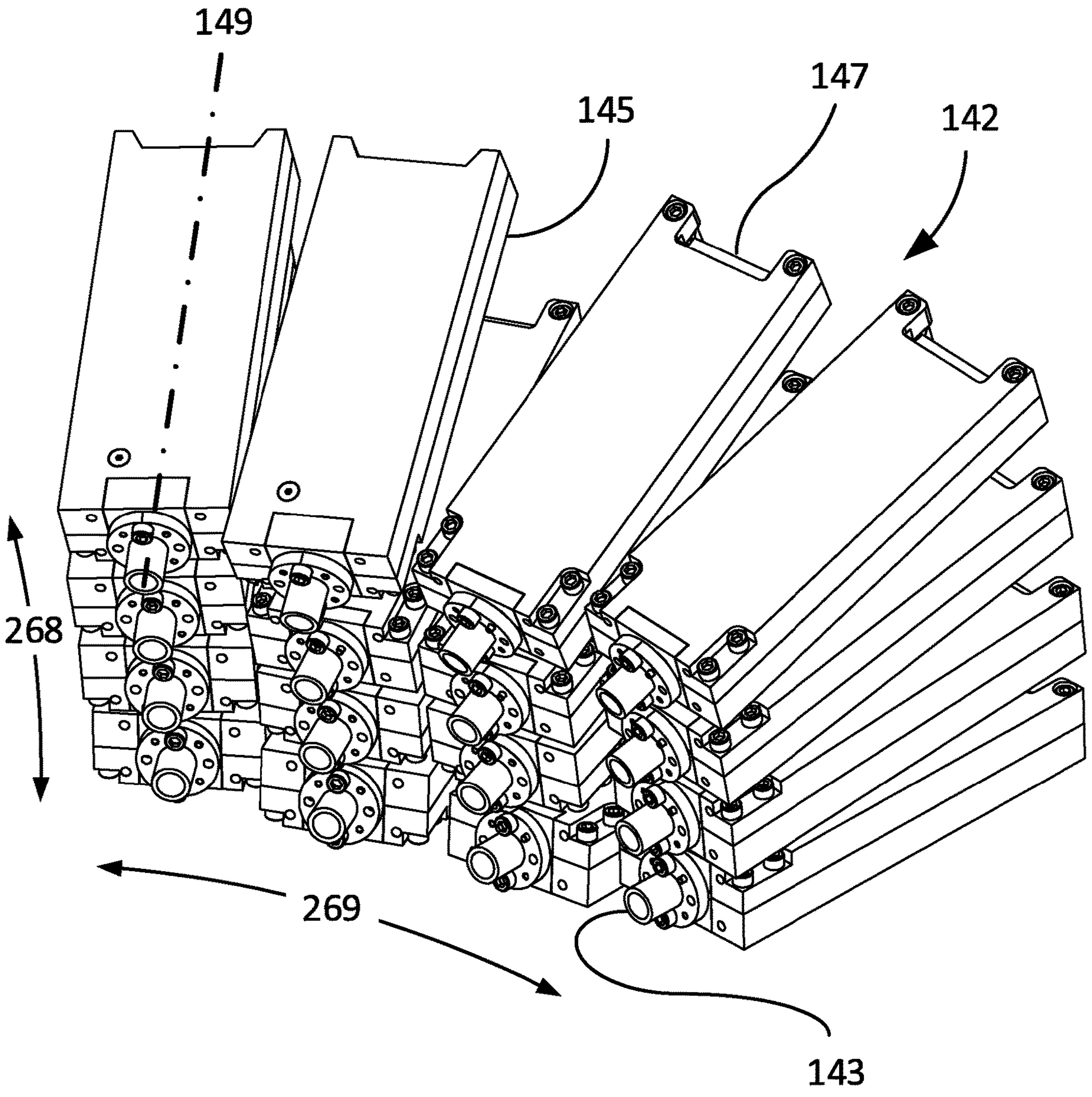

FIGS. 3A and 3B are line drawings of different perspective views of the detector array embodiment 142 of FIG. 2A without the camera housing 260 to better understand the orientation of the detectors 145 in the array 142. As shown in FIG. 3A and FIG. 3B, each of the detectors 145 has a line-of-sight 265 that converge in front of the array 142. The line-of-sight 265 is the detection path for the MMW energy 152 to go be detected by a given detector 145. Each line-of-sight 265 extends along a detector central axis 149, wherein the central axis 149 extends concentrically through the detector output end 147 and the detector receiving end 143.

By concentrically it is meant down the center of the detector 145 passing through the middle of (the center of) the detector output end 147 and the detector receiving end 143. Hence, if the detector receiving end 143 is circular shaped, concentric is in the center of the circle, for example. In some embodiments, the line-of-sight 265 of each detector 145 points towards a common focal point 270. The MMW detector receiving ends 143 of the 4×4 array 142 are angled in a concave shape with the vertical MMW detectors 145 arced as shown by the vertical concave arrow 268 and the horizontal MMW detectors 145 arced as shown by the horizontal concave arrow 269. In this way, the MMW matrix/array 142 generates a less distorted MMW picture 150 by adjusting or otherwise compensating for the curvature due to the movement of an oscillating mirror arrangement, not shown, that is configured to sweep left and right while traversing a scene 105 up to down, for example. Certain other embodiments contemplate the MMW detectors 145 being in a plane or some other complex curve instead of the line-of-sight 265 of each detector 145 pointing towards a common focal point 268.

FIGS. 4A and 4B are line drawings that illustratively depict a MMW detector 145 consistent with embodiments of the present invention. FIG. 4A is an isometric line drawing of a W-Band Radiometric Receiver MMW detector 145, which is commercially available from Eravant of Torrance, CA. As shown in FIG. 4A, the MMW detector embodiment 145 depicts the MMW detector receiving end 143, which receives or collects MMW energy 152 and a video output connector 147, which in this commercial embodiment comprises a 6-pin connector. The internal components of FIG. 4B are protected by the housing 180. Some of the key components of the MMW detector 145 include the waveguide 182, which concentrates and channels the MMW wave energy 152 to an amplifier 184 that boosts the signal to be converted from analog to digital in the analog to digital converter and processor 186. A digital video signal is output via the digital video output connector 147, which in the embodiment of FIG. 1C is piped to the computer system 125 via the MMW camera-to-computer connection 144. In short, raw MMWs 152 are received at the detector receiving end 143 and converted to digital MMW intensity data that is output via the detector output end 147 to be processed into a MMW contrast cell that is ultimately built with other contrast cells into an MMW picture 150 that is displayed on the display screen 130.

Figure 5A:
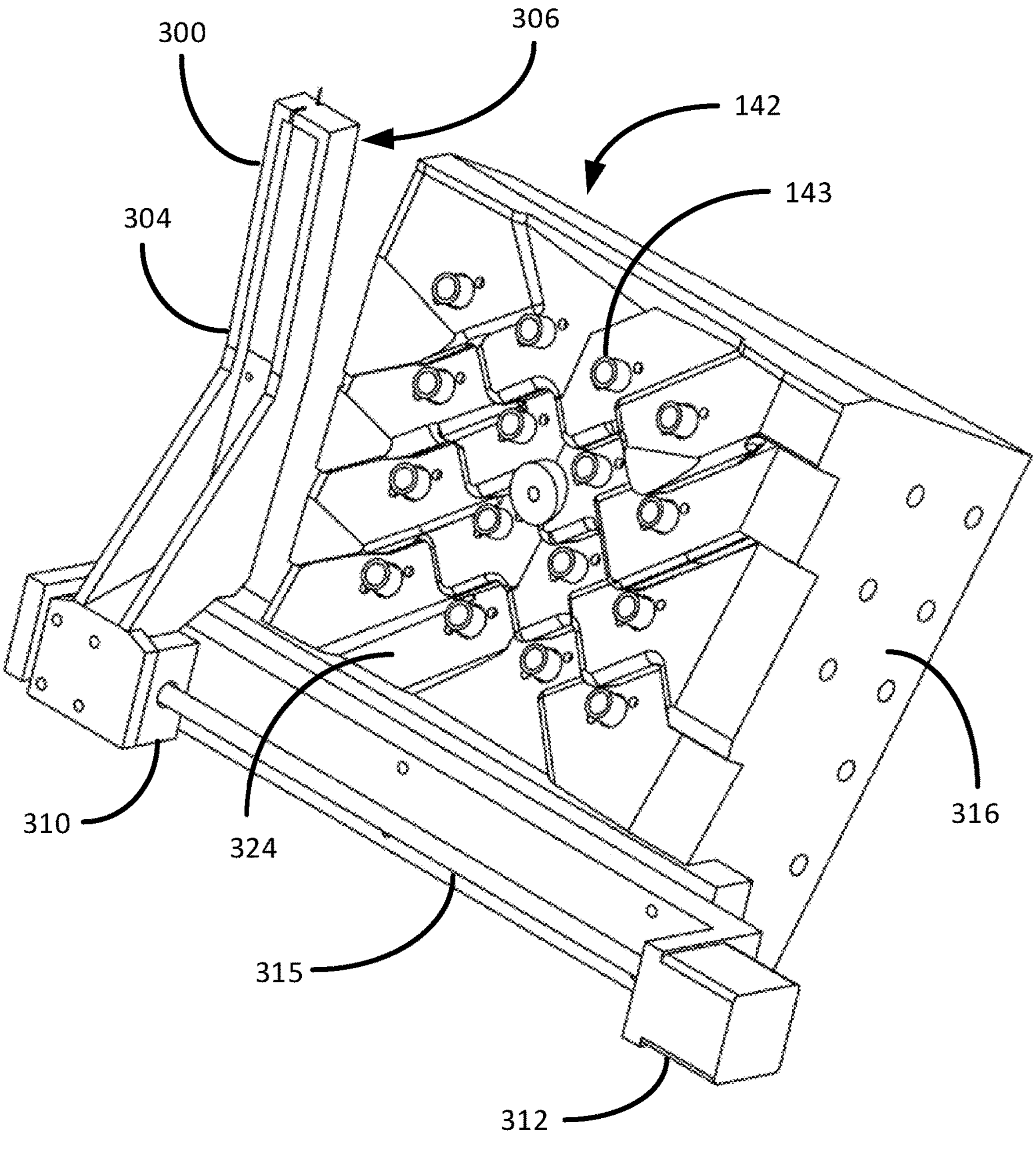
FIGS. 5A-5D illustratively depict an optional MMW camera and calibration arrangement consistent with embodiments of the present invention.
Figure 5B:
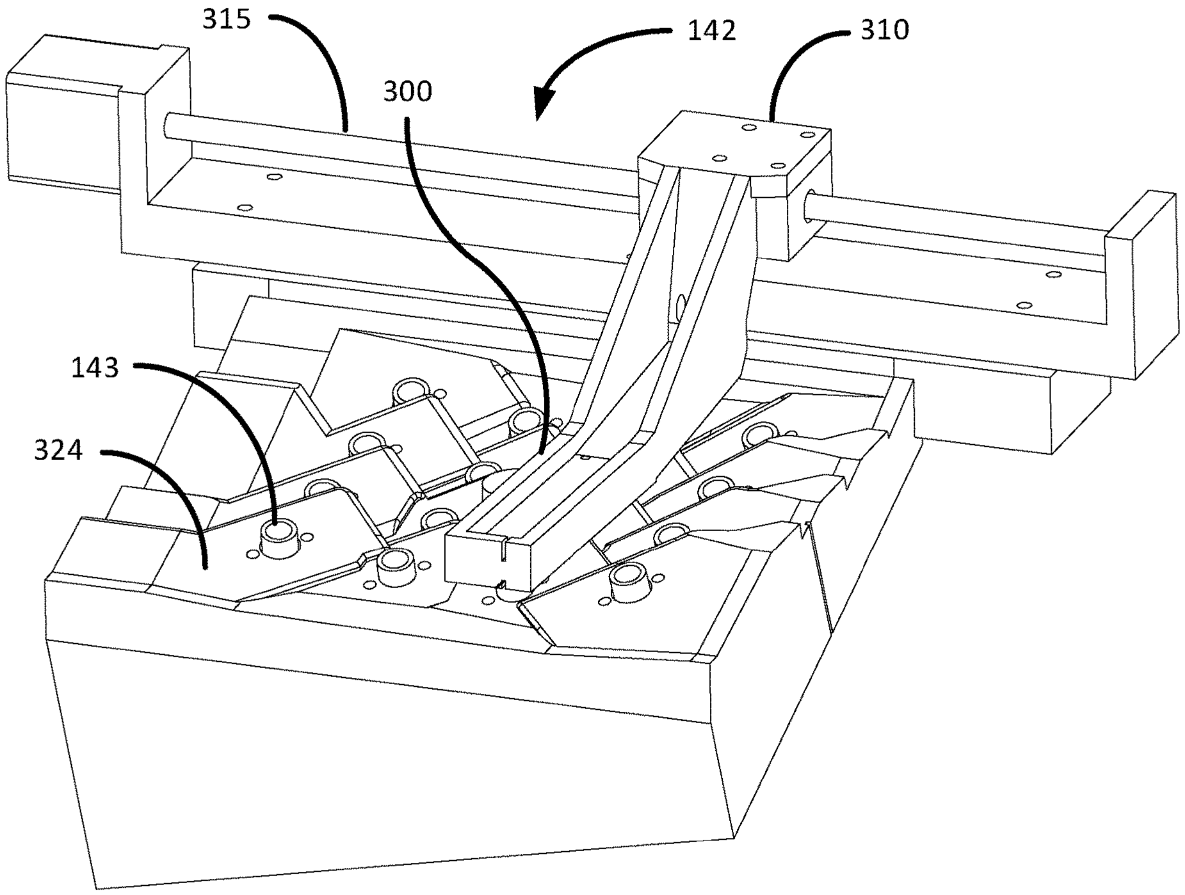

FIGS. 5A-5D illustratively depict an optional MMW camera and calibration arrangement consistent with embodiments of the present invention. In contrast to the rotary calibration embodiments described above, FIG. 5A illustrates a calibration bar 300 configured for linear traversal across the detector receiving ends 143 of the 4×4 detector array 142. In this embodiment, the calibration bar 300 translates laterally across the front face 324 of the array 142 in a manner analogous to a linear wiper mechanism. FIG. 5B depicts the calibration bar 300 in the process of traversing across the detector receiving ends 143 of the 4×4 detector array 142.

Similar to previously described calibration bars (e.g., calibration bar 280), the calibration bar 300 includes a calibration side 306 and an outward-facing bar side 304. The calibration bar 300 is coupled to a linear drive motor 310 configured to move along a guide shaft 315 extending across one side 316 of the front face 324 of the detector array 142 to a guide shaft support block 312. As the motor 310 traverses along the shaft 315, the calibration side 306 sequentially passes in front of rows of detector receiving ends 143, temporarily obscuring those detectors 145 and presenting a known calibration surface thereto.

The position of the calibration bar 300 along the shaft 315 is known at all times, for example via a position encoder or motor control feedback system, enabling system electronics to determine whether a given radiometer 145 is observing the scene 105 or the calibration side 306. As with the rotary embodiments, scene acquisition and calibration events are interleaved in a controlled manner.

Figure 5C:
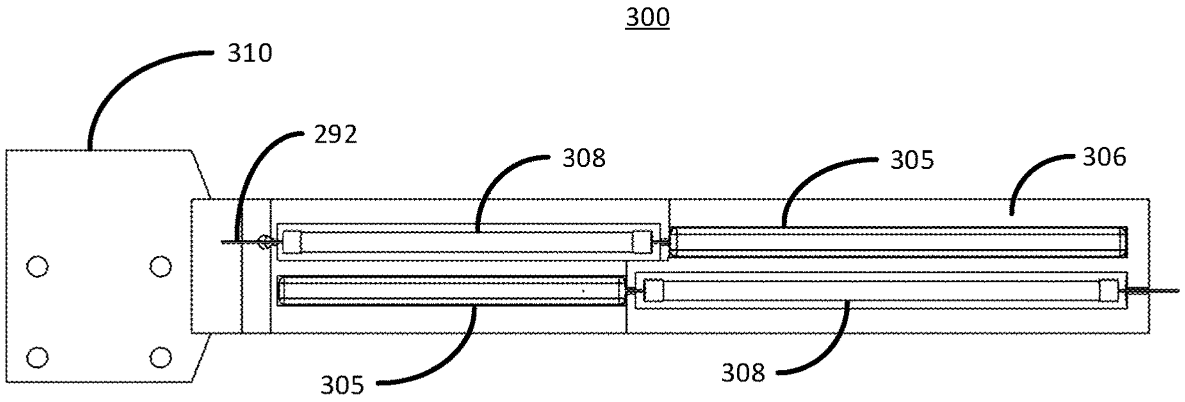
Figure 5D:
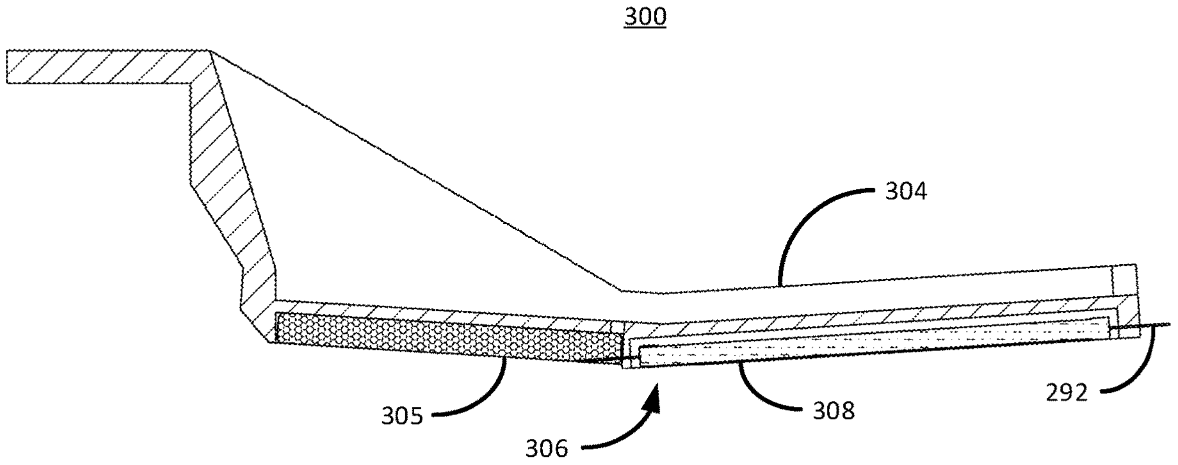

FIGS. 5C and 5D depict structural details of the calibration bar 300. In this embodiment, the calibration side 306 includes alternating calibration elements comprising heating elements 308 and ambient-temperature calibration bars 305 arranged along the length of the bar 300. The elements 305 and 308 are positioned in an alternating sequence such that, during a single linear sweep across a row of detector receiving ends 143, different detectors 145 encounter different reference conditions.

For example, in a row of four radiometers 145, the lower two detectors closet to the motor 310 may first encounter a heating element 308 while the upper two detectors furthest from the motor 310 encounter an adjacent ambient-temperature calibration bar 305. As the calibration bar 300 continues its traversal, the relative alignment shifts such that the previously lower detectors encounter an ambient-temperature calibration bar 305 while the previously upper detectors encounter a heating element 308. In this manner, each detector 145 within the row is exposed to both reference conditions during a single sweep of the calibration bar 300.

This alternating geometry enables efficient two-point calibration across the array without requiring multiple full traversals of the calibration bar 300.

FIG. 5D is a cross-sectional view of the calibration bar 300 illustrating the arrangement of calibration elements 305 and 308 along the calibration side 306. In the illustrated embodiment, an ambient-temperature calibration bar 305 is positioned adjacent a heating element 308, with the heating element 308 receiving power via electrical lead 292. The outward-facing bar side 304 is shown opposite the calibration side 306. The structural configuration permits the heating elements 308 and ambient calibration bars 305 to extend along substantially the full transverse dimension of the detector array 142, thereby ensuring consistent exposure across each row during traversal.

It should be appreciated that the calibration side 306 may include alternating reference elements as described above, or alternatively may comprise a single continuous reference element extending substantially along its length.

With the foregoing description in mind, the following illustrative embodiments are provided to complement the apparatus embodiments discussed above and depicted in the figures. The elements and configurations described below are presented by way of example to facilitate understanding of the present invention and are not intended to be limiting. It should be understood that individual elements, structural features, and functional aspects described in connection with one embodiment may be combined with, substituted for, or interchanged with those of other embodiments within the scope and spirit of the present invention.

In that light, certain embodiments of the present invention envision a millimeter-wave (MMW) calibration imaging system 140 comprising a detector 145, a motor 272, a calibration member 280, and a controller 125, as depicted in FIG. 2A. The detector 145 is configured to receive target-derived MMW energy 152 from a target 102 along a detection path 265. The motor 272 is coupled to the calibration member 280, either directly or through a shaft or other mechanical linkage. The motor 272 is configured to periodically move the calibration member 280 into and out of the detection path 265. When the calibration member 280 is positioned within the detection path 265, the detector 145 receives calibration-member-derived MMW energy. The controller 125 is configured to determine when the calibration member 280 is within the detection path 265 and to distinguish detector output corresponding to target-derived MMW energy from detector output corresponding to calibration-member-derived MMW energy.

The MMW calibration imaging system 140 further envisions the calibration member 280 comprising a first region 285 configured to be maintained at a first reference temperature and a second region 288 configured to be maintained at a second reference temperature different from the first reference temperature, as depicted in FIG. 2B. In certain embodiments, the first and second reference temperatures are actively controlled to maintain a predetermined temperature differential (ΔT). Optionally, at least one of the first or second regions 285, 288 comprises a resistive heating element.

The MMW calibration imaging system 140 further contemplates the calibration member 280 including a millimeter-wave absorbing material configured to present a substantially uniform radiometric brightness temperature. In certain embodiments, the millimeter-wave absorbing material comprises a magnetically lossy polymer composite.

The MMW calibration imaging system 140 further contemplates the motor 272 being configured to rotate the calibration member 280 about a rotational axis. In certain embodiments, the calibration member 280 rotates at a frequency between approximately 1 Hz and 20 Hz. Optionally, the calibration member 280 includes one or more airflow-inducing structures 283 configured to direct airflow across the detector 145 during rotation. In certain embodiments, the controller 125 regulates rotational speed using position feedback from the motor 272, wherein the position feedback may be derived from at least one of an optical encoder, a magnetic sensor, a resolver, a Hall-effect sensor, or step-count tracking of a stepper motor.

The MMW calibration imaging system 140 may further include the detector 145 being one of a plurality of radiometers arranged in an array. In such embodiments, the calibration member 280 is configured to sequentially occlude the plurality of radiometers during movement.

In another embodiment of the present invention, a millimeter-wave (MMW) camera calibration system 140 is envisioned to comprise at least one MMW detector 145, a calibration bar 280 moveably interposed between a target 102 and a processor 125 that applies functionality to the system 140, as depicted in FIG. 2A. This embodiment envisions at least one MMW detector 145 comprising a receiving end 143 configured to receive MMW energy 152 along a line-of-sight 265 during a period of time. The calibration bar 280 is configured to move, during the period of time, between a first position intersecting the line-of-sight 265 within six inches of the receiving end 143 (or preferably within one inch) and a second position outside the line-of-sight 265. It should be appreciated that further distances can be applied given the specific architecture of the system 140. And, the processor 125 is configured to associate (that is correspond) detector output with calibration data when the calibration bar 280 is in the first position and with scene data when the calibration bar 280 is in the second position, which is naturally the case as the calibration bar 280 sweeps across the receiving end or ends 143.

The MMW camera calibration system 140 further contemplates the calibration bar 280 comprising a first region 285 that is configured to be maintained at a first reference temperature and a second region 288 that is configured to be maintained at a second reference temperature that is different from the first reference temperature.

The MMW camera calibration system 140 further imagines the first reference temperatures being configured to be actively controlled to maintain a predetermined temperature differential (ΔT) from the second reference temperature.

The MMW camera calibration system 140 further envisions a motor 272 being configured to rotate the calibration member 280 about a rotational axis.

Yet another embodiment of the present invention contemplates a millimeter-wave (MMW) imaging calibration arrangement 140 generally comprising a MMW detector 145 coupled to a calibration bar 280 that is driven by a motor and a processor 125 that applies functionality to the arrangement 140. This embodiment envisions the MMW detector 145 comprising a MMW energy receiving end 143 that defines a line-of-sight 265. The calibration bar 280 is configured to move during a period of time between a first position intersecting the line-of-sight 265 within six inches of the receiving end 143 and a second position outside the line-of-sight 265. The processor 125 is configured to determine whether the calibration bar 280 is in the first or the second position and to assign detector output based on the determined position of the calibration bar 280, meaning that the MMW detector 145 is taking in data of a target 102 but shifts to take calibration data of the calibration bar 280 when the calibration bar 280 goes in front of the receiving end 143 and then back to taking data of the target 102 (maybe adjusted from any kind of drive based on the calibration).

The MMW imaging calibration arrangement 140 further imagines the calibration bar 280 comprising a first region 285 configured to be maintained at a constant temperature.

The above sample embodiments should not be considered limiting to the scope of the invention whatsoever because many more embodiments and variations of embodiments are easily conceived within the teachings, scope and spirit of the instant specification.

It is to be understood that even though numerous characteristics and advantages of various embodiments of the present invention have been set forth in the foregoing description, together with details of the structure and function of various embodiments of the invention, this disclosure is illustrative only, and changes may be made in detail, particularly in matters of structure, motion architecture, temperature control implementation, sensing methodology, and arrangement of components within the principles of the present invention to the full extent indicated by the broad general meaning of the terms in which the appended claims are expressed. For example, the calibration member may be configured as a rotating element, a linearly translating element, an oscillating member, or another movable structure capable of periodically intersecting a detector line-of-sight without departing from the scope and spirit of the present invention. Likewise, position determination of the calibration member may be accomplished using optical encoders, magnetic sensors, stepper motor position tracking, timing-based inference, or other feedback mechanisms. Further, the calibration member may include one or more reference regions maintained at controlled temperatures, a single reference region, or an absorbing region configured to present a substantially uniform radiometric brightness temperature. Temperature regulation may be achieved using resistive heaters, distributed heating elements, thermally conductive substrates, closed-loop thermal feedback systems, or equivalent structures. Airflow-inducing structures may optionally be integrated to promote thermal stability of the detector during operation. Additionally, the detector may comprise a single radiometer or a plurality of radiometers arranged in an array, and the calibration member may be configured to sequentially occlude individual detectors or groups of detectors. Variations in physical spacing between the calibration member and the detector, including distances greater or less than those specifically described, may be implemented based on system geometry without departing from the scope and spirit of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A millimeter-wave (MMW) calibration imaging system comprising:

- a detector configured to receive target-derived MMW energy from a target along a detection path;
- a motor coupled to a calibration member, the motor configured to periodically move the calibration member into and out of the detection path, the detector is configured to receive calibration-member-derived MMW energy when the calibration member is in the detection path; and
- a controller configured to determine when the calibration member is within the detection path and to distinguish first detector output corresponding to the target-derived MMW energy from second detector output corresponding to the calibration-member-derived MMW energy.

2. The MMW calibration imaging system of claim 1, wherein the calibration member comprises a first region that is configured to be maintained at a first reference temperature and a second region that is configured to be maintained at a second reference temperature different from the first reference temperature.

3. The MMW calibration imaging system of claim 2, wherein the first and the second reference temperatures and are configured to be actively controlled to maintain a predetermined temperature differential (ΔT).

4. The MMW calibration imaging system of claim 2, wherein at least one of the first or the second regions and comprises a resistive heating element.

5. The MMW calibration imaging system of claim 1, wherein the calibration member includes a millimeter-wave absorbing material configured to present a substantially uniform radiometric brightness temperature.

6. The MMW calibration imaging system of claim 5, wherein the millimeter-wave absorbing material comprises a magnetically lossy polymer composite.

7. The MMW calibration imaging system of claim 1, wherein the motor is configured to rotate the calibration member about a rotational axis.

8. The MMW calibration imaging system of claim 7, wherein the calibration member is configured to rotate at a frequency between approximately 1 Hz and 20 Hz.

9. The MMW calibration imaging system of claim 7, wherein the controller is configured to regulate the rotational speed using position feedback from the motor.

10. The MMW calibration imaging system of claim 9, wherein the position feedback is derived from at least one of an optical encoder, a magnetic sensor, a resolver, a Hall-effect sensor, or step-count tracking of a stepper motor.

11. The MMW calibration imaging system of claim 7, wherein the calibration member includes one or more airflow-inducing structures configured to direct airflow across the detector while the calibration member is rotating.

12. The MMW calibration imaging system of claim 1, wherein the detector is one of a plurality of radiometers arranged in an array.

13. The MMW calibration imaging system of claim 12, wherein the calibration member is configured to sequentially occlude the plurality of radiometers in the array during movement.

14. A millimeter-wave (MMW) camera calibration system comprising:

- at least one MMW detector comprising a receiving end configured to receive MMW energy along a line-of-sight during a period of time;
- a calibration bar configured to move, during the period of time, between a first position intersecting the line-of-sight within six inches of the receiving end and a second position outside the line-of-sight; and
- a processor configured to associate detector output with calibration data when the calibration bar is in the first position and with scene data when the calibration bar is in the second position.

15. The MMW camera calibration system of claim 14, wherein the calibration bar comprises a first region that is configured to be maintained at a first reference temperature and a second region that is configured to be maintained at a second reference temperature that is different from the first reference temperature.

16. The MMW camera calibration system of claim 14, wherein the first reference temperatures is configured to be actively controlled to maintain a predetermined temperature differential (ΔT) from the second reference temperature.

17. The MMW camera calibration system of claim 14, wherein the motor is configured to rotate the calibration member about a rotational axis.

18. A millimeter-wave (MMW) imaging calibration arrangement comprising:

- a MMW detector comprising a MMW energy receiving end that defines a line-of-sight;
- a calibration bar configured to move during a period of time between a first position intersecting the line-of-sight within six inches of the receiving end and a second position outside the line-of-sight; and a processor configured to determine whether the calibration bar is in the first or the second position and to assign detector output based on the determined position of the calibration bar.

19. The MMW imaging calibration arrangement of claim 18, wherein the calibration bar comprises a first region configured to be maintained at a constant temperature.

20. The MMW imaging calibration arrangement of claim 18, wherein the motor is configured to rotate the calibration member about a rotational axis.

* * * * *